United States Patent
Campbell

(10) Patent No.: US 9,205,618 B2
(45) Date of Patent: Dec. 8, 2015

(54) ACTUATOR FOR SPRAY CONTAINER AND METHOD REGARDING SAME

(71) Applicant: Valspar Sourcing, Inc., Minneapolis, MN (US)

(72) Inventor: Jason C. Campbell, Chicago, IL (US)

(73) Assignee: VALSPAR SOURCING, INC., Minneapolis, MN (US)

(*) Notice: Subject to any disclaimer, the term of this patent is extended or adjusted under 35 U.S.C. 154(b) by 193 days.

(21) Appl. No.: 14/097,628

(22) Filed: Dec. 5, 2013

(65) Prior Publication Data

US 2014/0091493 A1 Apr. 3, 2014

Related U.S. Application Data

(62) Division of application No. 13/121,888, filed as application No. PCT/US2009/059513 on Oct. 5, 2009, now Pat. No. 8,622,256.

(60) Provisional application No. 61/103,059, filed on Oct. 6, 2008.

(51) Int. Cl.
*B29D 99/00* (2010.01)
*B65D 83/20* (2006.01)
*B65D 83/22* (2006.01)

(52) U.S. Cl.
CPC .......... *B29D 99/0096* (2013.01); *B65D 83/205* (2013.01); *B65D 83/22* (2013.01)

(58) Field of Classification Search
USPC ........................................................ 264/242
See application file for complete search history.

(56) References Cited

U.S. PATENT DOCUMENTS

| | | |
|---|---|---|
| D189,271 S | 11/1960 | Hibbs et al. |
| D198,111 S | 4/1964 | Abplanalp |
| D205,739 S | 9/1966 | Pizzuro |
| D206,968 S | 2/1967 | Pizzuro |
| D208,224 S | 8/1967 | Crowell |
| D208,886 S | 10/1967 | Vuillemenot et al. |
| 3,373,908 A | 3/1968 | Crowell |
| 3,632,024 A | 1/1972 | Usen |
| 3,729,119 A | 4/1973 | Sette et al. |
| 3,754,689 A | 8/1973 | Blank |
| D228,547 S | 10/1973 | Grothoff |
| D229,825 S | 1/1974 | Hayes |

(Continued)

FOREIGN PATENT DOCUMENTS

| | | |
|---|---|---|
| WO | 2007/022422 A2 | 2/2007 |
| WO | 2007/022422 A3 | 2/2007 |
| WO | 2010/042431 A1 | 4/2010 |

OTHER PUBLICATIONS

"Krylon innovation inspired," advertisement (2005), retrieved using web.archive.org, 2 pages; and 2 pages of enlarged images of the can shown in advertisement.

(Continued)

*Primary Examiner* — Jacob Thomas Minskey
(74) *Attorney, Agent, or Firm* — Mueting, Raasch & Gebhardt, P.A.

(57) ABSTRACT

Actuator apparatus for spray containers and methods of manufacturing actuator apparatus for spray containers. The actuator apparatus includes a cover having a restraint structure, e.g., locatable below an aperture portion of a push button of a base, to restrict the push button from depression by a user when the actuator apparatus is in a locked position.

13 Claims, 33 Drawing Sheets

(56) References Cited

U.S. PATENT DOCUMENTS

| | | |
|---|---|---|
| D230,472 S | 2/1974 | Hayes |
| 3,848,778 A | 11/1974 | Meshberg |
| D238,855 S | 2/1976 | Hayes |
| D246,895 S | 1/1978 | van der Heijden |
| 4,135,638 A | 1/1979 | Wandl |
| 4,572,410 A | 2/1986 | Brunet |
| D314,917 S | 2/1991 | Thompson |
| 5,027,982 A | 7/1991 | Demarest |
| 5,083,684 A | 1/1992 | Ebina et al. |
| D365,990 S | 1/1996 | McSwiggan et al. |
| D379,433 S | 5/1997 | Croft |
| 5,649,645 A | 7/1997 | Demarest et al. |
| D436,038 S | 1/2001 | Ruiz de Gopegui |
| D457,061 S | 5/2002 | Walters |
| 6,523,722 B1 | 2/2003 | Clark et al. |
| D471,106 S | 3/2003 | Pannozzo et al. |
| D492,193 S | 6/2004 | Miller et al. |
| 6,769,572 B1 | 8/2004 | Cullotta |
| D497,808 S | 11/2004 | Morris et al. |
| D510,864 S | 10/2005 | Morris et al. |
| D510,865 S | 10/2005 | Geier |
| 7,178,694 B2 | 2/2007 | Costa et al. |
| D538,651 S | 3/2007 | Nukuto et al. |
| D564,876 S | 3/2008 | Nickel et al. |
| D572,130 S | 7/2008 | Campbell |
| D580,755 S | 11/2008 | Campbell |
| D599,665 S | 9/2009 | Campbell |
| 8,418,892 B2 | 4/2013 | Geier |
| 8,622,256 B2 | 1/2014 | Campbell |
| 2003/0209569 A1 | 11/2003 | Jackson et al. |
| 2005/0017027 A1 | 1/2005 | Yerby et al. |
| 2007/0039979 A1 | 2/2007 | Strand et al. |
| 2007/0235474 A1 | 10/2007 | Downey et al. |
| 2008/0041889 A1 | 2/2008 | Geier |
| 2008/0061087 A1 | 3/2008 | Reedy et al. |
| 2008/0164285 A1 | 7/2008 | Hygema |
| 2008/0179347 A1 | 7/2008 | Yerby et al. |
| 2008/0210710 A1 | 9/2008 | Marquardt et al. |
| 2011/0180570 A1 | 7/2011 | Campbell |

OTHER PUBLICATIONS

International Search Report and Written Opinion of the International Searching Authority issued Dec. 3, 2009 for Patent Application PCT/US2009/059513, filed Oct. 5, 2009; 7 pgs.

Supplementary European Search Report, issued Jul. 24, 2012, in Europe for related European Patent Application No. 09819709.8 (PCT/US2009059513). (5 pages).

International Preliminary Report on Patentability. Issued on Apr. 12, 2011 in Europe. Patent Application filed Oct. 5, 2009 as PCT/US2009/059513. 6 pages.

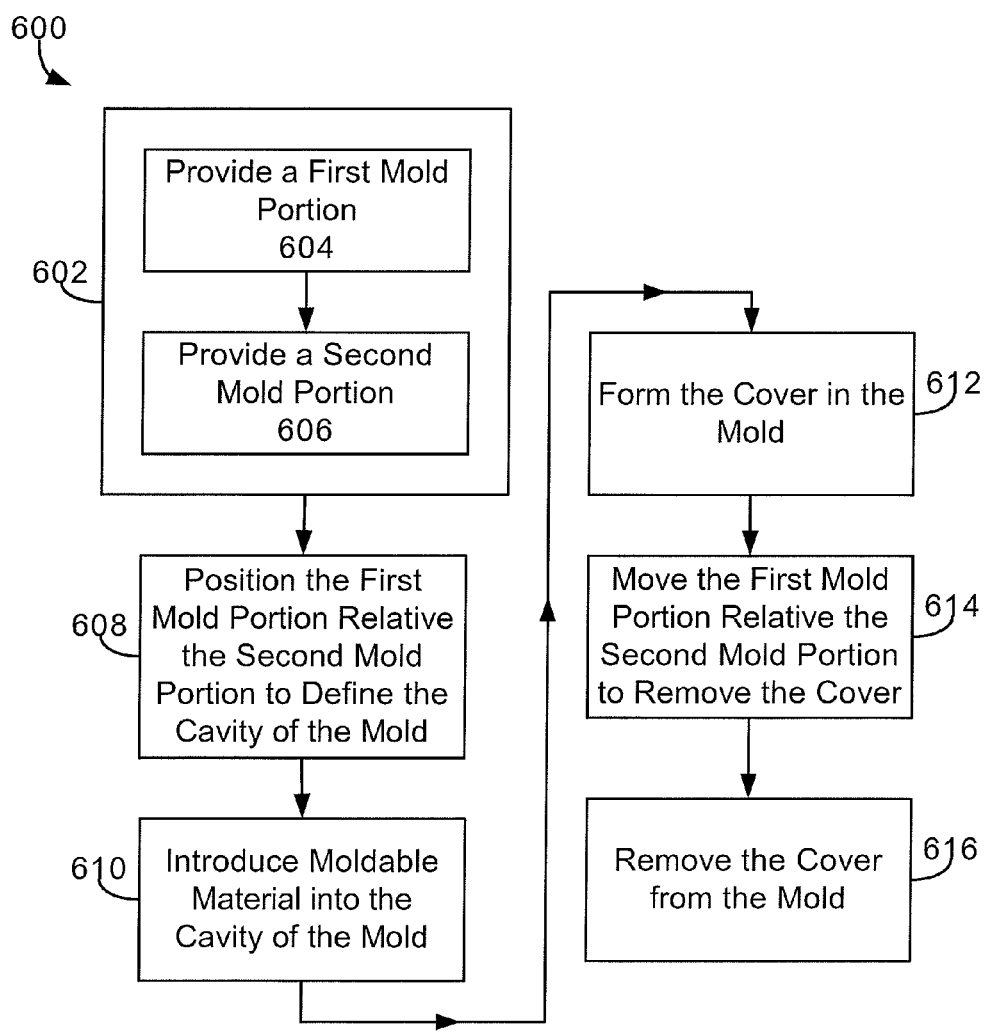

ACTUATOR FOR SPRAY CONTAINER AND METHOD REGARDING SAME

CROSS-REFERENCE TO RELATED APPLICATIONS

This application is a divisional application of U.S. patent application Ser. No. 13/121,888 filed on Mar. 30, 2011, which is the U.S. National Stage of International Application No. PCT/US2009/059513, filed on 5 Oct. 2009, which claims the benefit of U.S. Provisional Application Ser. No. 61/103,059 filed 6 Oct. 2008, entitled "ACTUATOR FOR SPRAY CONTAINER," all of which are incorporated herein by reference in their entireties.

BACKGROUND

The disclosure herein relates generally to actuators for spray containers and methods of manufacturing actuators for spray containers.

Spray containers containing many different components or contents such as, e.g., paint, adhesives, corrosives, lubricants, insect repellents, hairsprays, creams, edibles, foams, etc. have been marketed for many household, commercial, and industrial purposes.

In certain conventional spray containers, an actuator apparatus may include a tubular valve stem element biased into a closed position which, when depressed into the body of the container opens the valve and releases the contents which are held under pressure. When the applied force at the valve stem is removed, the valve stem returns to its closed position simultaneously stopping the outward flow of the pressurized contents of the container. For example, in one type of spray container, the actuator apparatus may include a button fitted directly over the valve stem such that when the button is depressed, the valve stem is simultaneously depressed or tilted against a spring bias causing the contents of the container to be released via an outlet. Release of the pressure at the button returns the valve stem to its equilibrium position. Often, a protective cover is fitted over the top of the spray container covering the actuator apparatus and is removed before use. Such protective covers may then be placed back over the actuator apparatus, e.g., for safe storage.

In another type of spray container, an actuator apparatus may include a cap having a button or trigger. By depressing the button or trigger, the contents of the spray container may be sprayed, e.g., through an opening in the cap. Often, the button or trigger is not protected from accidental depression by a user.

Lockable actuator apparatuses have been described. For example, U.S. Pat. No. 6,523,722 to Clark et al., U.S. Pat. App. Pub. No. 2005/0017027 to Yerby et al., and U.S. Pat. App. Pub. No. 2007/0039979 to Strand et al. disclose various lockable actuators for spray containers. However, such designs may include many separate components and/or may be too complex such that the components and/or complexity may increase manufacturing problems (e.g., complex multi-piece molds, etc.), which may increase the cost of such actuators.

SUMMARY

The disclosure herein relates generally to actuators for spray containers and methods of manufacturing actuators for spray containers.

In one embodiment of the actuator apparatus for a spray container, the actuator apparatus includes a base and a cover coupled to the base. The base includes a lower portion couplable to the spray container and a push button depressibly attached to the lower portion. The push button includes a body portion, an aperture portion, and a receiver stem for receiving a valve assembly. The body portion extends along an axis of the actuator apparatus between a first end region connectable to the lower portion of the base and a second end region to be contacted for depression of the push button by a user. The aperture portion extends radially from a region of the body portion and defines an exit aperture. The receiver stem portion defines an entrance aperture. A fluid passageway extends between the entrance aperture and the exit aperture. Further, the push button is movable relative to the lower portion of the base between at least a normal position and a depressed position. When the push button is in the depressed position, the push button actuates the valve assembly to provide a spray through the exit aperture. The cover defines a push button opening that permits access to the second end region of the body portion of the push button to allow depression of the push button by the user. Further, the cover and the base are movable relative to each other between at least a locked position such that the push button is restricted from moving into the depressed position and an unlocked position such that the push button is allowed to move into the depressed position. The cover further defines a spray opening alignable with the exit aperture of the aperture portion when the cover is in the unlocked position. Further, the cover includes a restraint structure and the restraint structure is located below the aperture portion of the push button of the base to restrict the push button from moving into the depressed position when the cover is in the locked position.

In another embodiment, the actuator apparatus for a spray container includes a base and a cover coupled to the base. The base includes a lower portion couplable to the spray container and a push button depressibly attached to the lower portion. The push button includes a body portion and an aperture portion. The body portion extends between a first end region connectable to the lower portion of the base and a second end region to be contacted for depression of the push button by a user. The aperture portion extends radially from a region of the body portion. Further, the push button is movable relative to the lower portion of the base by depression of the push button by the user. Still further, the aperture portion defines an exit aperture. The cover defines a push button opening that permits access to the second end region of the body portion to allow depression of the push button by the user. Also, the cover and the base are rotatably movable relative to each other between an unlocked position and a locked position. The cover includes a cylindrical inner wall portion lying parallel to an axis of the actuator apparatus and the cylindrical inner wall portion defines at least a portion of the push button opening. The cover further includes a restraint structure locatable below the aperture portion of the push button of the base to restrict the push button from depression by the user when in the locked position. Further, at least a portion of the restraint structure is located closer to the axis of the actuator apparatus than the cylindrical inner wall portion of the cover. Still further, the cover defines a spray opening alignable with the exit aperture by rotating the cover and the base relative to each other when in the unlocked position.

In one embodiment, a method of manufacturing a cover for an actuator apparatus having a base including a lower portion and a centrally-located push button depressibly attached to the lower portion is described. The method of manufacturing includes providing a mold defining a cavity for forming the cover. The cover defines a centrally-located push button opening that permits access to the push button of the base when assembled with the base. Further, the cover includes an inner wall portion, an outer wall portion, and a restraint structure extending from the inner wall portion. The inner wall portion lies along an axis of the actuator apparatus when assembled with the base and defines at least a portion of the push button opening. The outer wall portion is located at a distance further away from the axis than the inner wall portion when assembled with the base and defines a spray opening. The restraint structure extends from the inner wall portion and at least a portion of the restraint structure is located closer to the axis of the actuator apparatus when assembled than the inner wall portion of the cover. The mold includes a first mold portion and a second mold portion. The first mold portion defines a first molding surface corresponding to at least outer and inner wall portion surfaces of the cover facing a first direction and at least a lower surface of the restraint structure. The second mold portion defines a second molding surface corresponding to at least outer and inner wall portion surfaces of the cover facing a second direction opposite from the first direction and at least an upper surface of the restraint structure. The method further includes positioning the first mold portion relative to the second mold portion such that the first molding surface of the first mold portion and the second molding surface of the second mold portion define the cavity of the mold for forming the cover and introducing moldable material into the cavity of the mold. Still further, the method includes forming the cover from the moldable material within the cavity of the mold, moving the first mold portion relative to the second mold portion for removing the cover from the cavity of the mold, and removing the cover from the cavity of the mold.

The above summary is not intended to describe each embodiment or every implementation of the actuator apparatus or methods of manufacturing such actuator apparatus. Advantages, together with a more complete understanding, will become apparent and appreciated by referring to the following detailed description and claims taken in conjunction with the accompanying drawings.

BRIEF DESCRIPTION OF THE DRAWING

FIG. 31 is a block diagram of a method of manufacturing a cover, e.g., the cover of FIG. 12, for an actuator apparatus.

Figure 1:
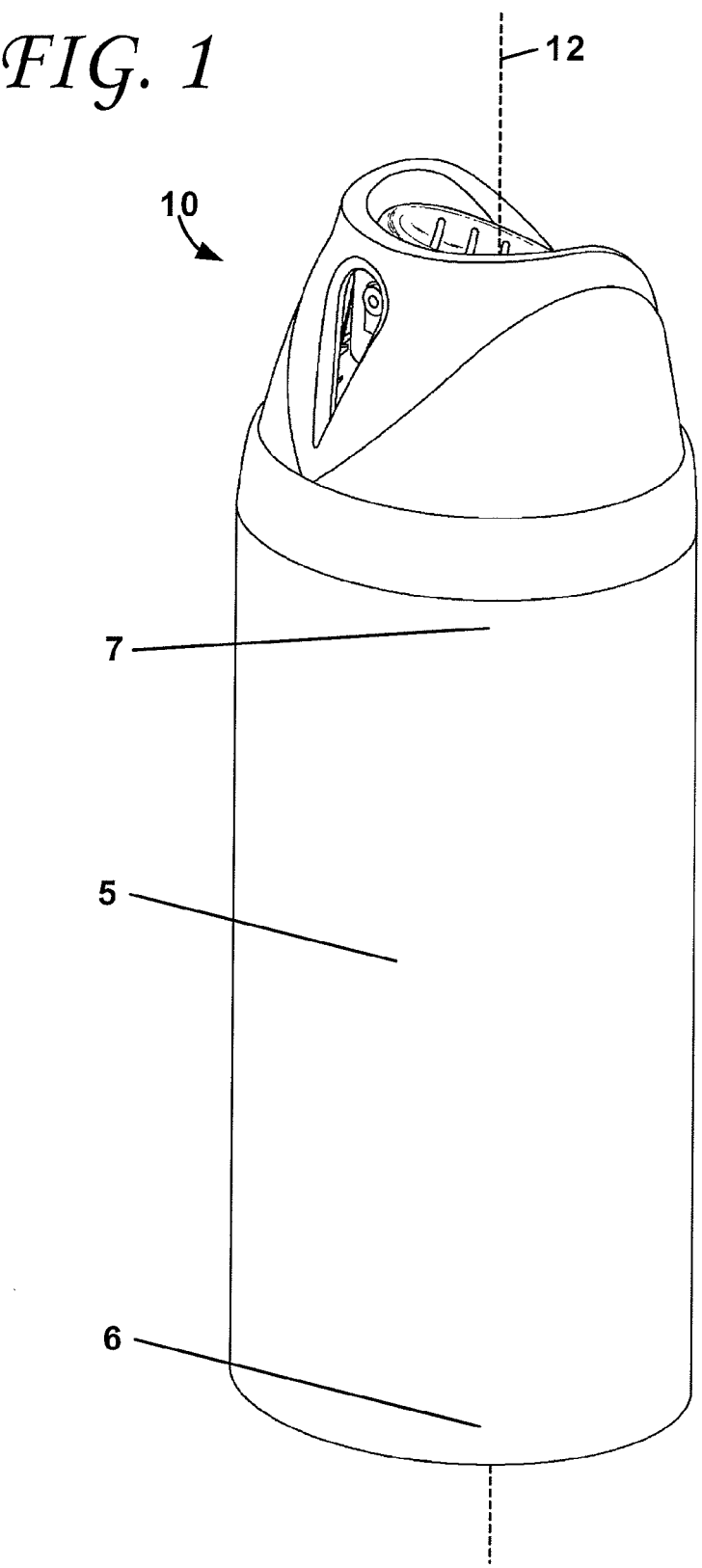
FIG. 1 is a front perspective view of a spray container and an exemplary embodiment of an actuator apparatus in an unlocked position.

The figures are rendered primarily for clarity and, as a result, are not necessarily drawn to scale.

DETAILED DESCRIPTION OF EXEMPLARY EMBODIMENTS

In the following detailed description of illustrative embodiments, reference is made to the accompanying figures of the drawing which form a part hereof, and in which are shown, by way of illustration, specific embodiments which may be practiced. It is to be understood that other embodiments may be utilized and structural changes may be made without departing from the scope of the disclosure.

A spray container 5 is shown in FIGS. 1-4 extending from a bottom portion 6 to a top portion 7 along an axis 12. An exemplary actuator apparatus 10 is coupled to the top portion 7 of the spray container 5. The spray container 5 (e.g., a cylindrical spay can) may be any spray container containing a pressurized material that may be actuated by a user to release (e.g., spray) the pressurized contents from an opening. Further, the spray container 5 may contain many different liquid materials such as, e.g., paint, adhesives, corrosives, lubricants, insect repellents, hairsprays, creams, edibles, foams, tear gas, pepper spray, and/or any other contents as would be known by one having ordinary skill in the art. Also, the spray container 5 may be formed of any material capable of containing its contents under pressure, e.g., metals, polymers, etc.

As shown in FIGS. 1-4, the spray container 5 includes a cylindrical can. Although the spray container 5 depicted in FIGS. 1-4 is cylindrical, the actuator apparatus may be operably coupled to a spray container having any shape and/or size, e.g., a square container.

Figure 2:
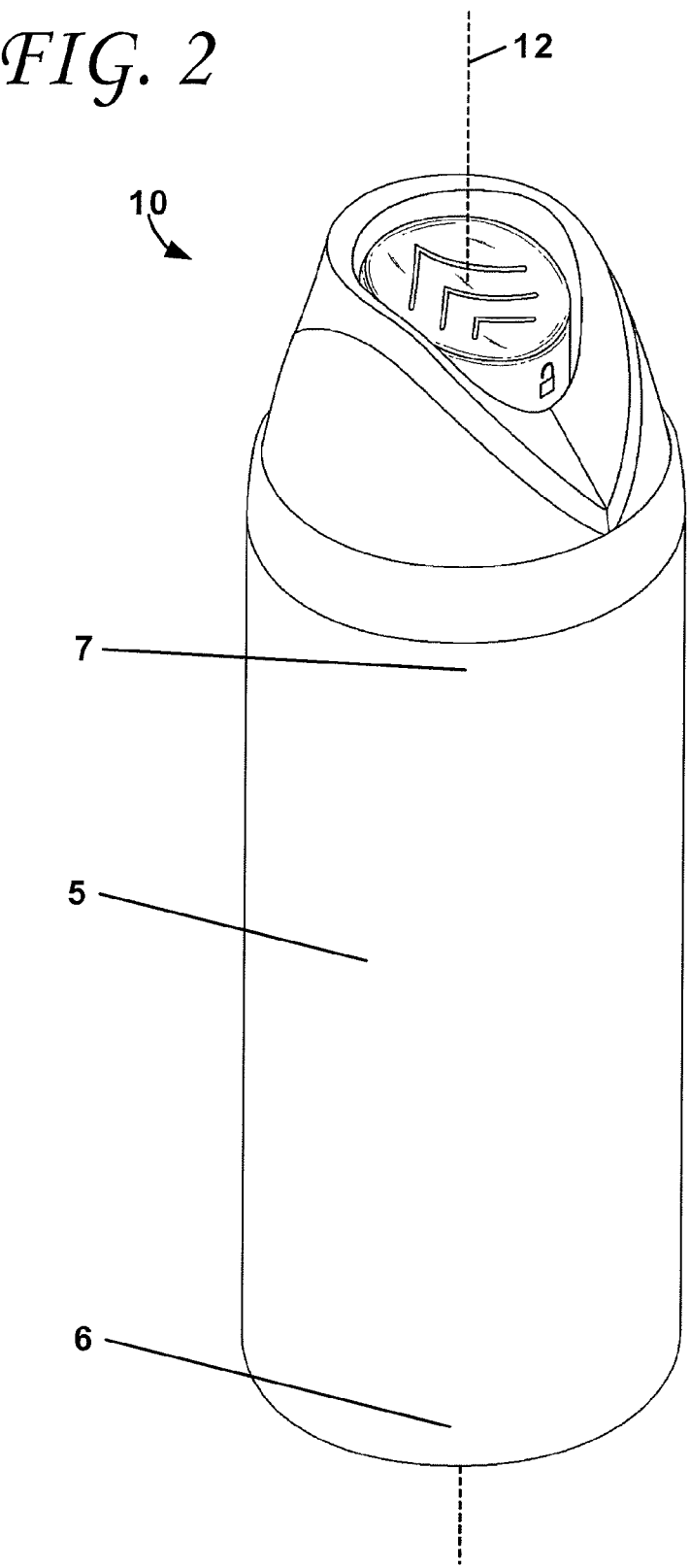
FIG. 2 is a rear perspective view of the spray container and the actuator apparatus of FIG. 1 in the unlocked position
Figure 3:
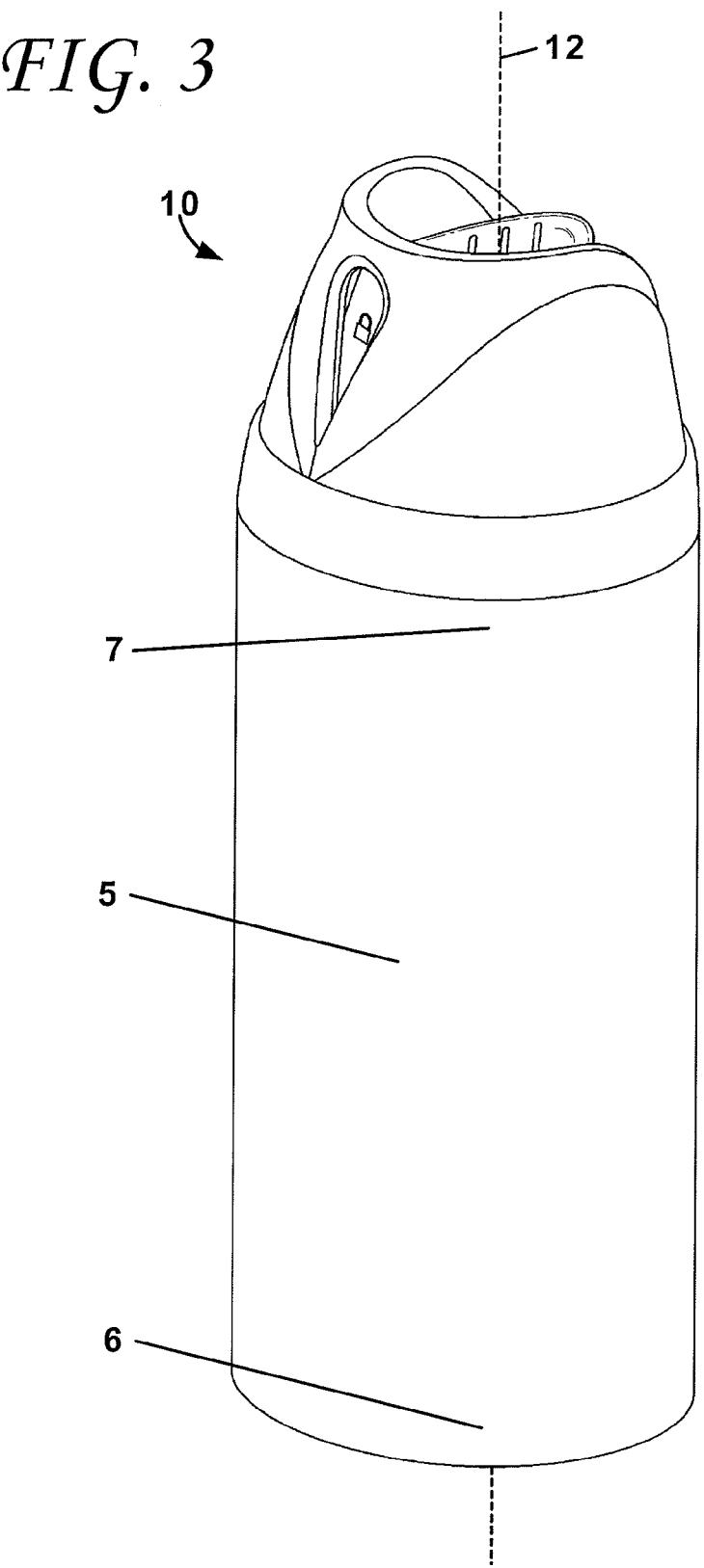
FIG. 3 is a front perspective view of the spray container and the actuator apparatus of FIG. 1 but in a locked position.
Figure 4:
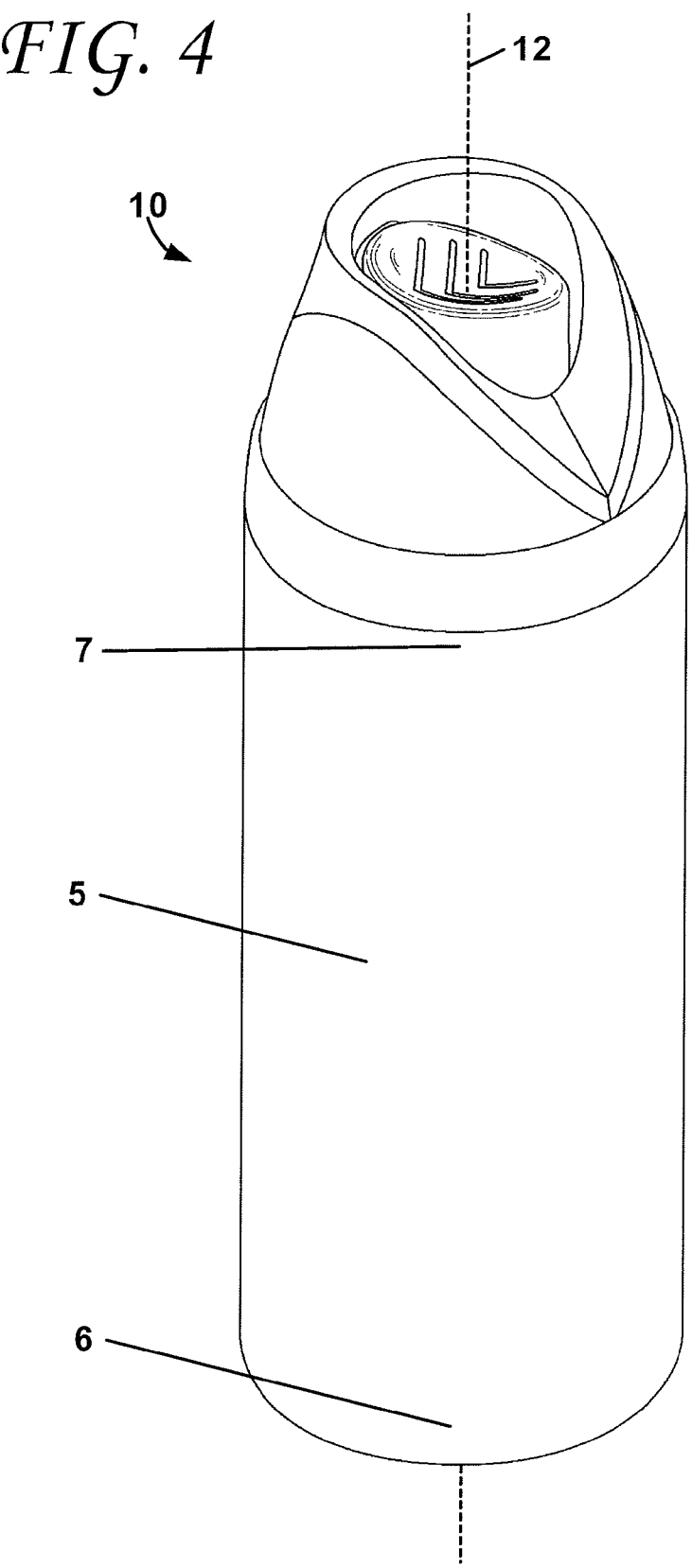
FIG. 4 is a rear perspective view of the spray container and the actuator apparatus of FIG. 1 but in a locked position.

Two or more components of the actuator apparatus 10 are movable relative to each other between two or more different positions. A locked position is depicted in FIGS. 1-2 while an unlocked position is depicted in FIGS. 3-4. In the unlocked position, the actuator apparatus 10 may allow a user to release at least some of the pressurized contents contained in the spray container 5. In the locked position, the actuator apparatus 10 may restrict (e.g., inhibit) a user from releasing the pressurized contents contained within the spray container 5.

Figure 5:
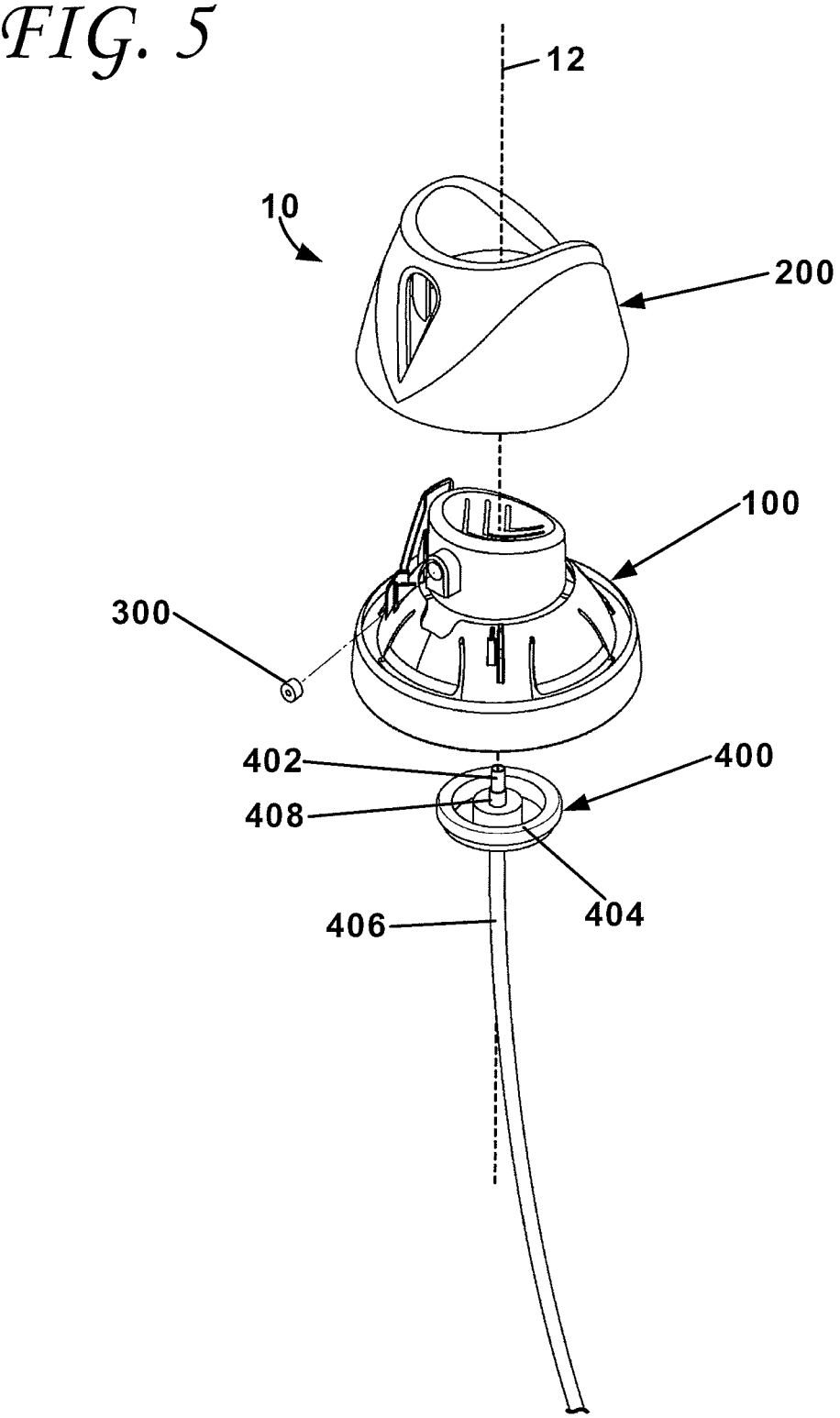
FIG. 5 is an exploded, perspective view of the actuator apparatus of FIG. 1.
Figure 6:
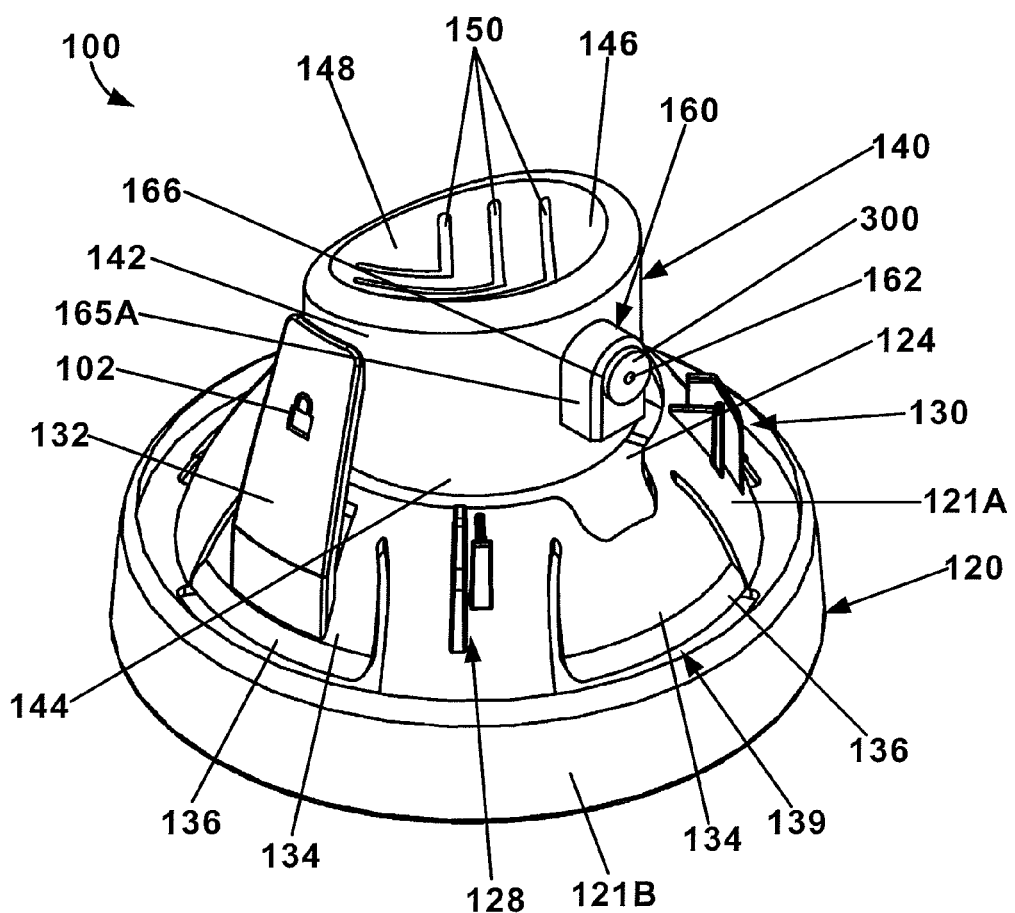
FIG. 6 is a perspective view of the base of the actuator apparatus of FIG. 1.
Figure 7:
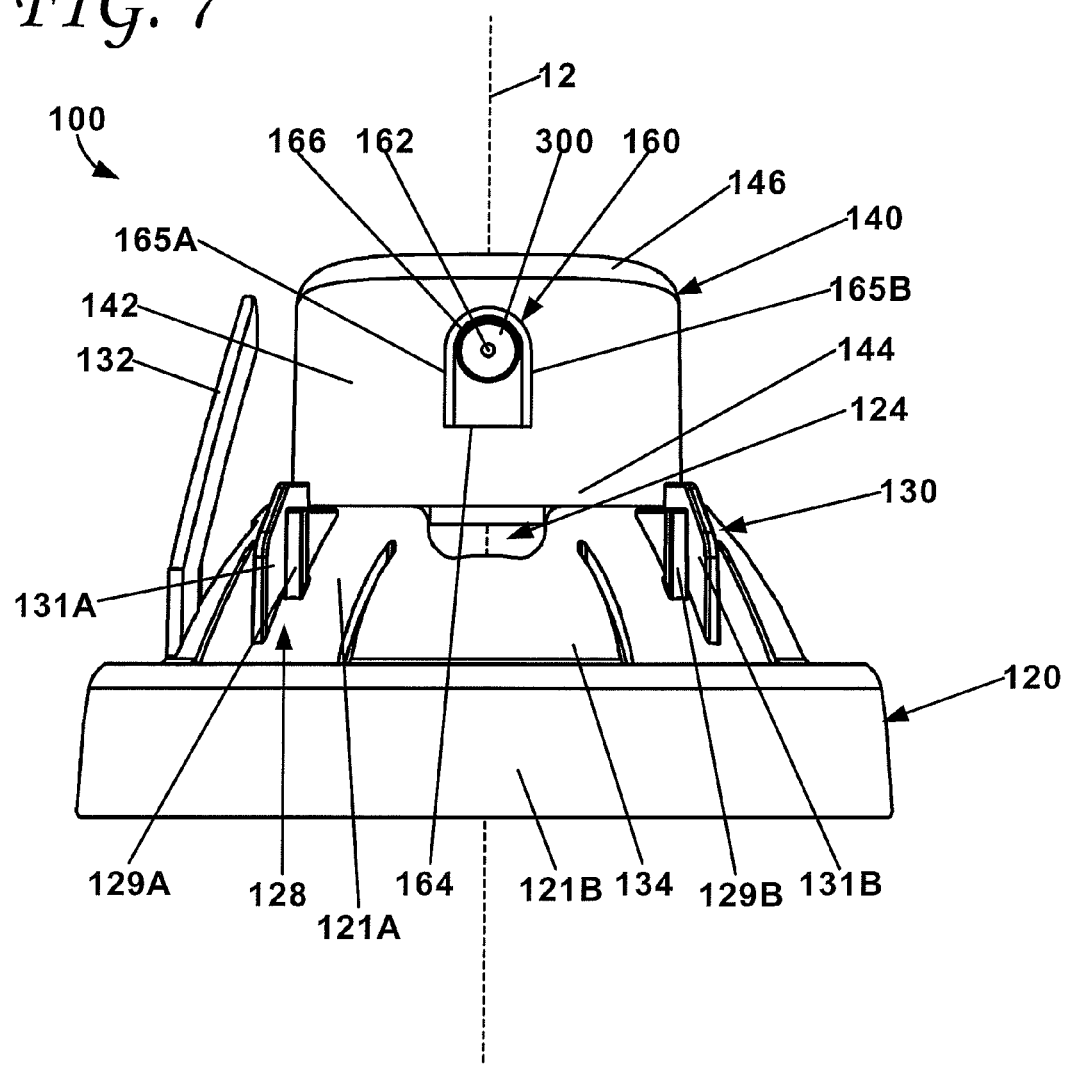
FIG. 7 is a front view of the base of FIG. 6.
Figure 8:
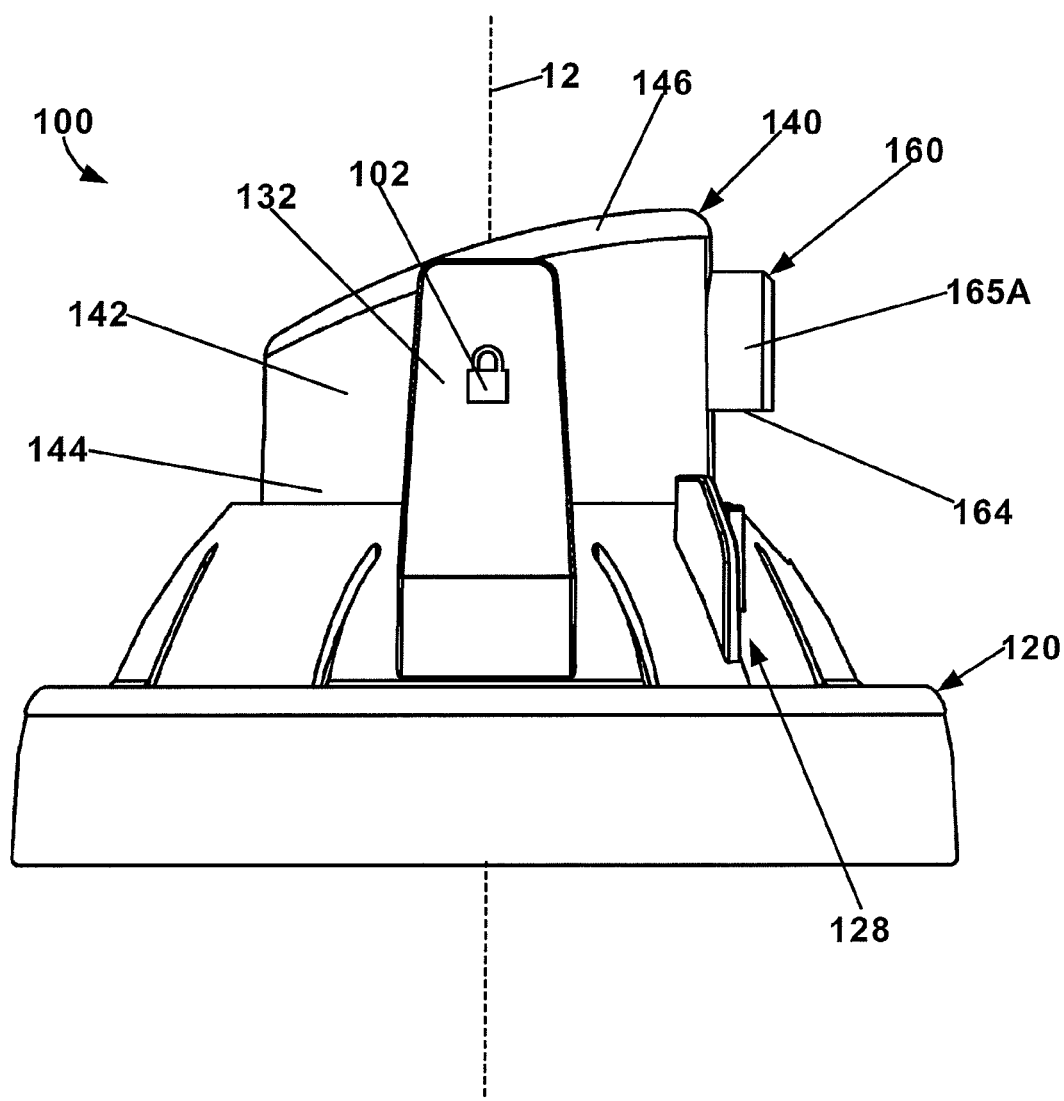
FIG. 8 is a side view of the base of FIG. 6.
Figure 9:
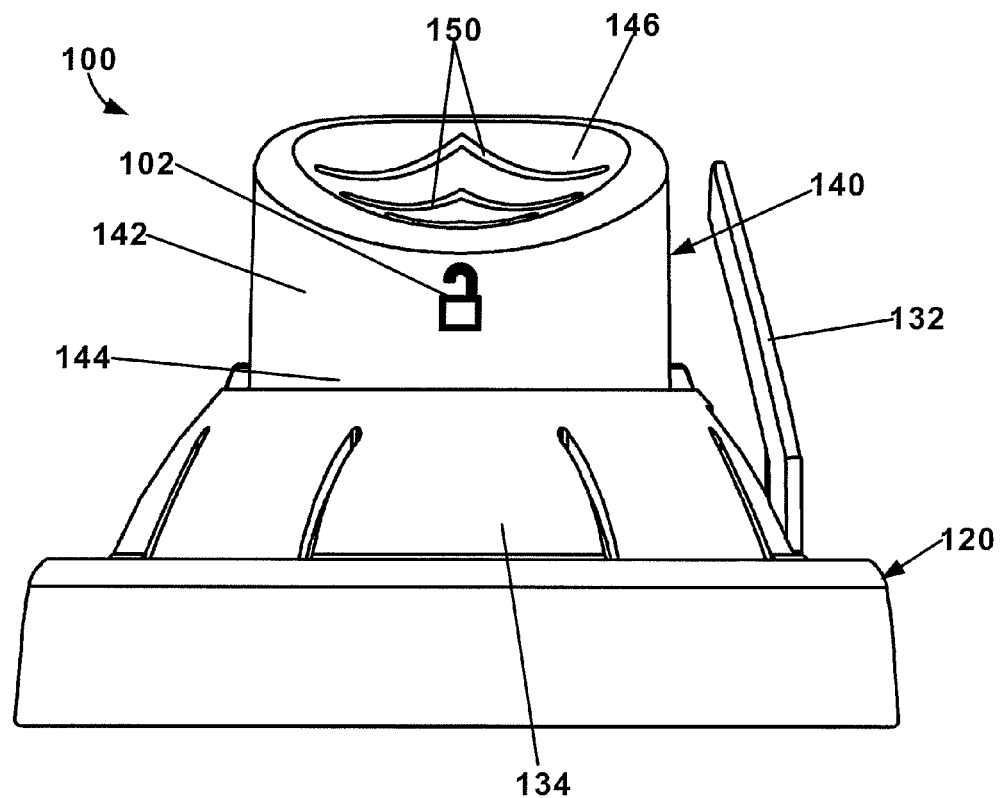
FIG. 9 is a rear view of the base of FIG. 6.

An exploded view of an exemplary embodiment of the actuator apparatus 10 arranged along an axis 12 is depicted in FIG. 5. The actuator apparatus 10 may include a base 100, a cover 200, an insert 300, and a valve assembly 400.

Figure 28:
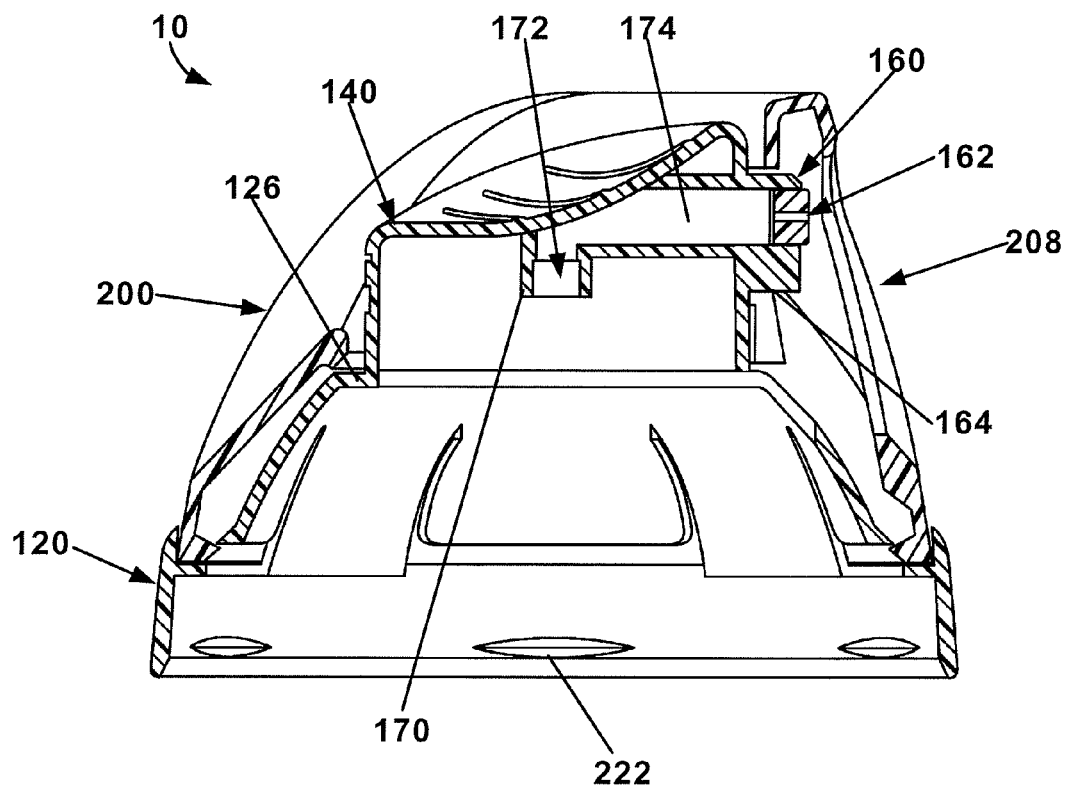
FIG. 28 is a cross-sectional view of the actuator apparatus of FIG. 27 taken along line 28-28 with the push button in a normal position.

The valve assembly 400 may include an actuation valve 402, a flanged cup portion 404, and a tube portion 406. When assembled with the spray container 5, the flanged cup portion 404 may be coupled (e.g., crimped, press-fit, adhered, welded, etc.) to at least a portion of the top of the spray container 5, the tube portion 406 may extend into the interior of the spray container 5, and the actuation valve 402 may extend upward from the top of the spray container 5. The actuation valve 402 and flanged cup portion 404 may further include various structures to operably couple the actuation valve 402 to a portion of the base such that any pressurized contents released through the actuation valve 402 flow into a portion of the base 100 (e.g., through passageway 174 as shown in FIG. 28). The flanged cup portion 404 may include a centrally-disposed circular stepped protrusion 408 upon which the actuation valve 402 extends. Such stepped protrusion 408 may include portions having different diameters that may improve the coupling between the valve assembly 400 and the base 100. In at least one embodiment, the components of the valve assembly 400 may be formed of the same material. In other embodiments, the components of the valve assembly 400 may be separate components coupled together.

The actuation valve 402 may be movable to, e.g., release the pressurized contents of a spray container (e.g., spray container 5). Such movement of the actuation valve 402 may be downward depression, axially movement, etc.

One having ordinary skill in the art will recognize that other valve configurations may be utilized with the apparatus described herein. For example, any valve assembly operable by a push button as described herein to release contents of a spray container may be utilized in conjunction with the actuator apparatus 10 or variations thereof.

The base 100 may include a lower portion 120 and a push button 140 (see FIGS. 6-11). The push button 140 may be depressibly attached to the lower portion 120. As used herein, "depressibly attached" may refer to attachment such that the push button 140 may be depressed under normal force by a user to move the push button 140 relative to the lower portion 120.

The lower portion 120 may include a first end region 121A and a second end region 121B located further away from the axis 12 than the first end region 121A. The second end region 121B may be the portion of the base 100 that is coupleable to the spray container 5 utilizing, e.g., one or more protrusions 122 (see FIG. 11) that may facilitate a "snap-fit" to the top of the spray container 5. Further, the lower portion 120 may define a push button aperture 124 located directly below the push button 140 to facilitate downward movement of the push button 140 (e.g., such that when the push button 140 is depressed, at least a portion of the push button 140 may be located within the push button aperture 124).

Figure 10:
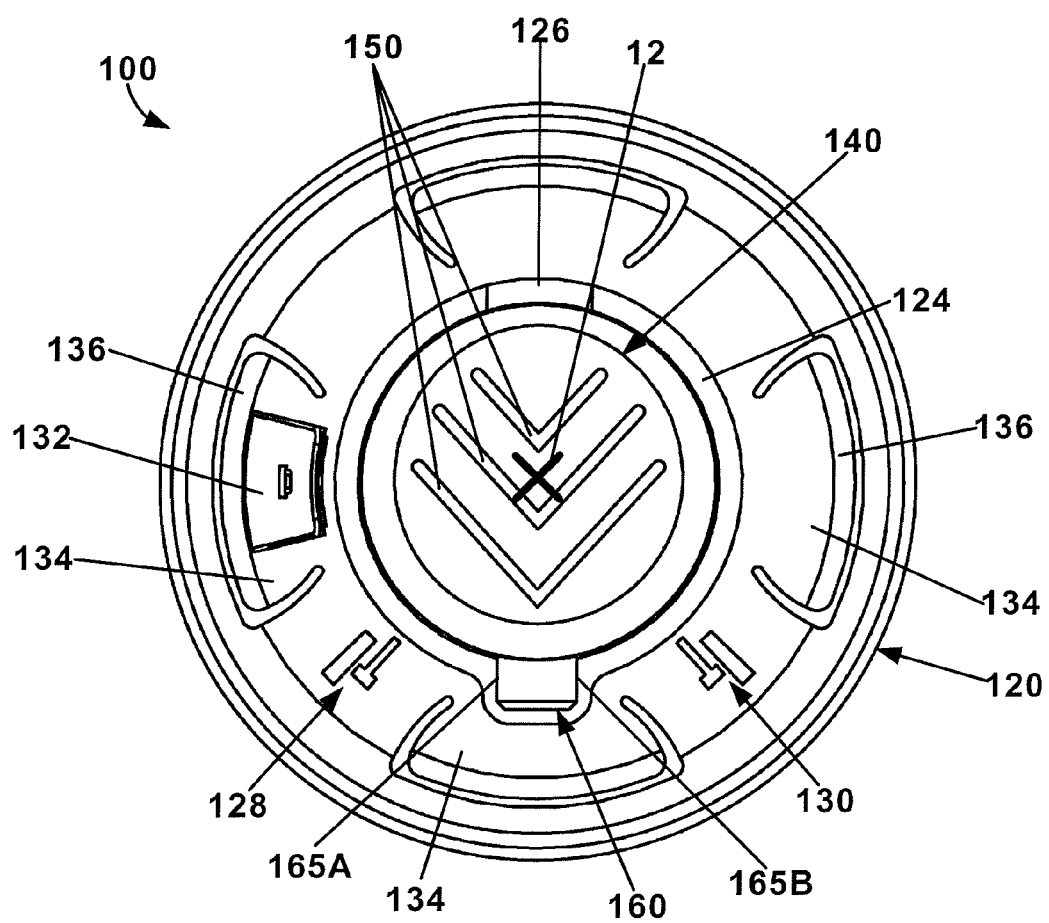
FIG. 10 is a top view of the base of FIG. 6.
Figure 11:
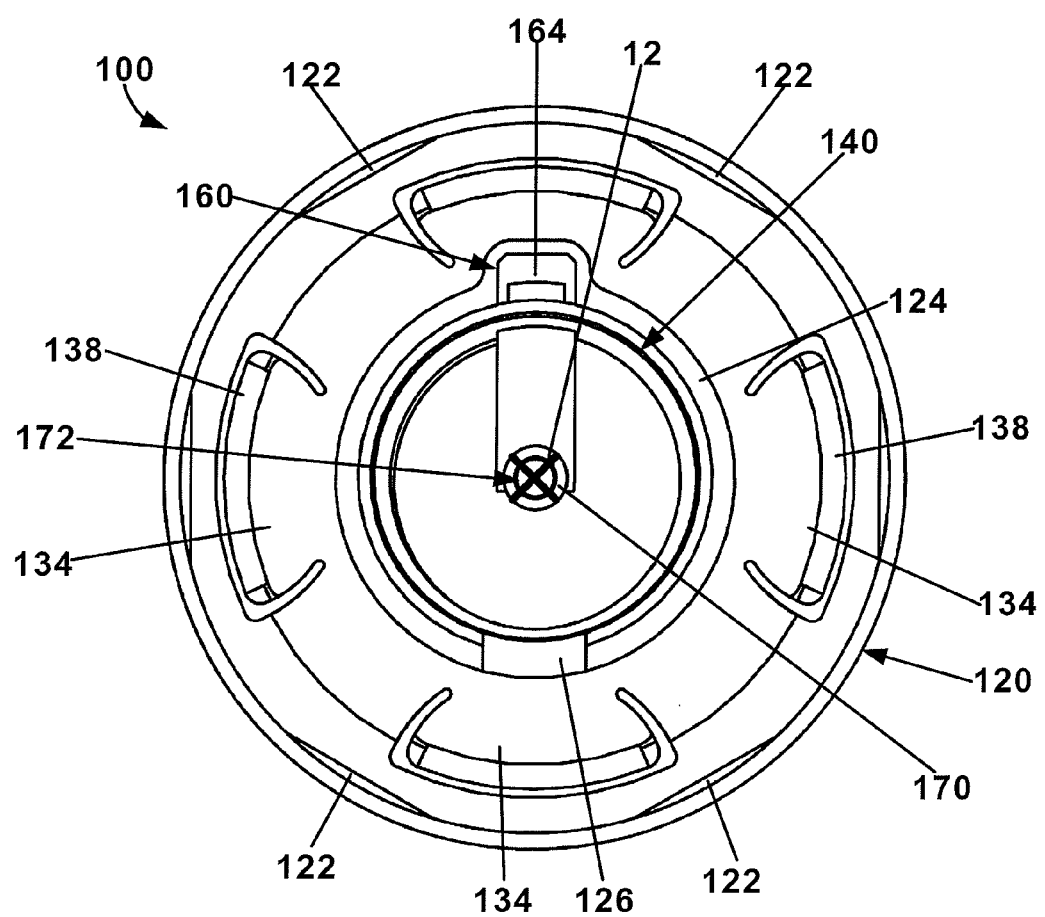
FIG. 11 is a bottom view of the base of FIG. 6.
Figure 12:
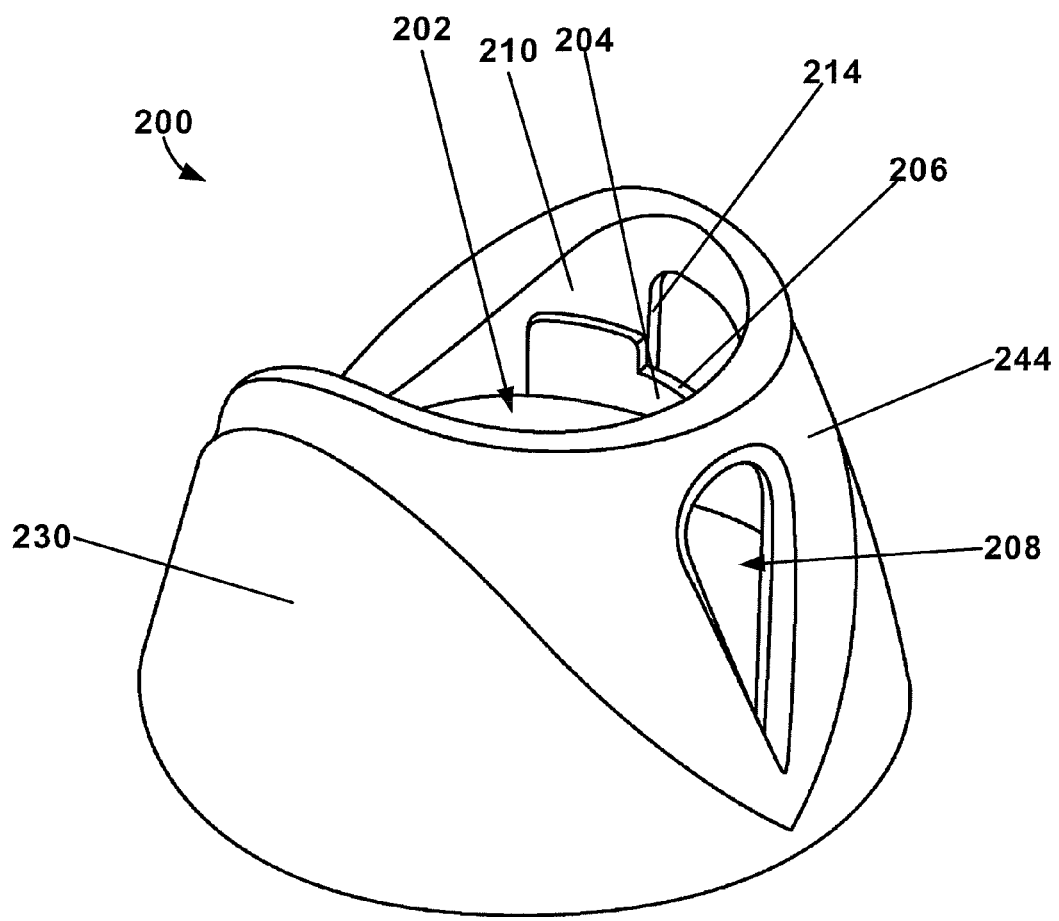
FIG. 12 is a front perspective view of the cover of the actuator apparatus of FIG. 1.
Figure 13:
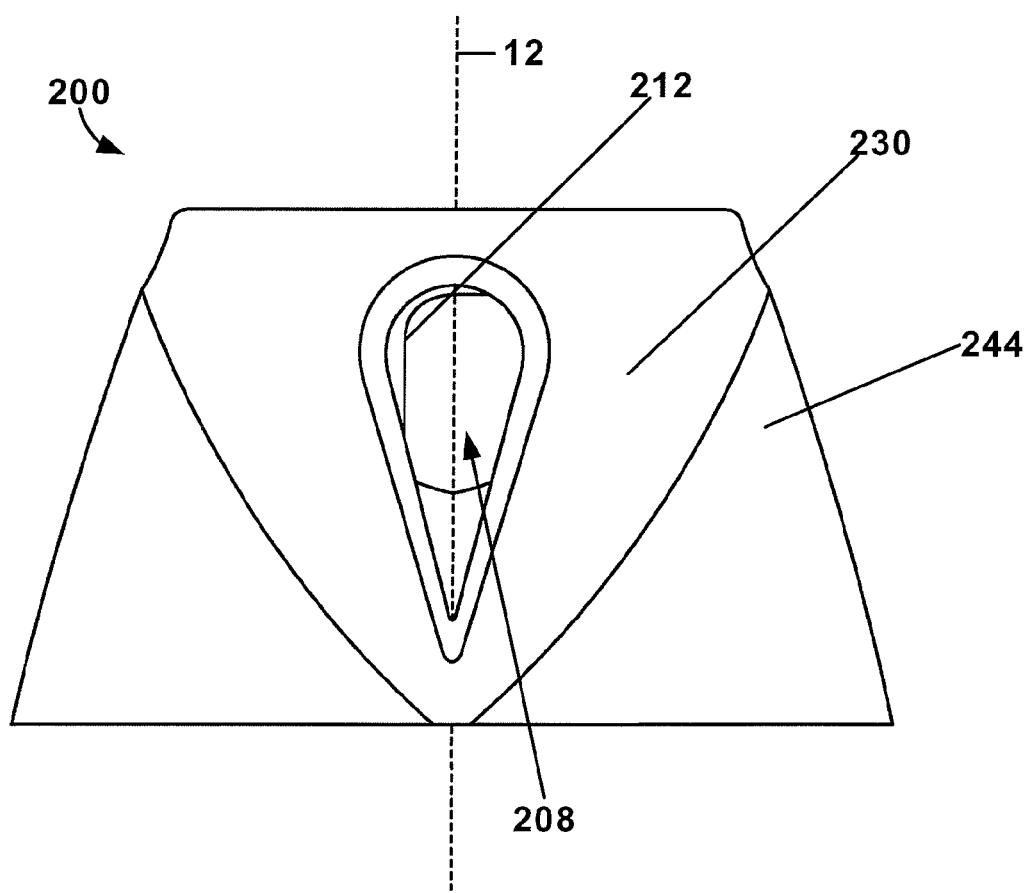
FIG. 13 is a front view of the cover of FIG. 12.
Figure 14:
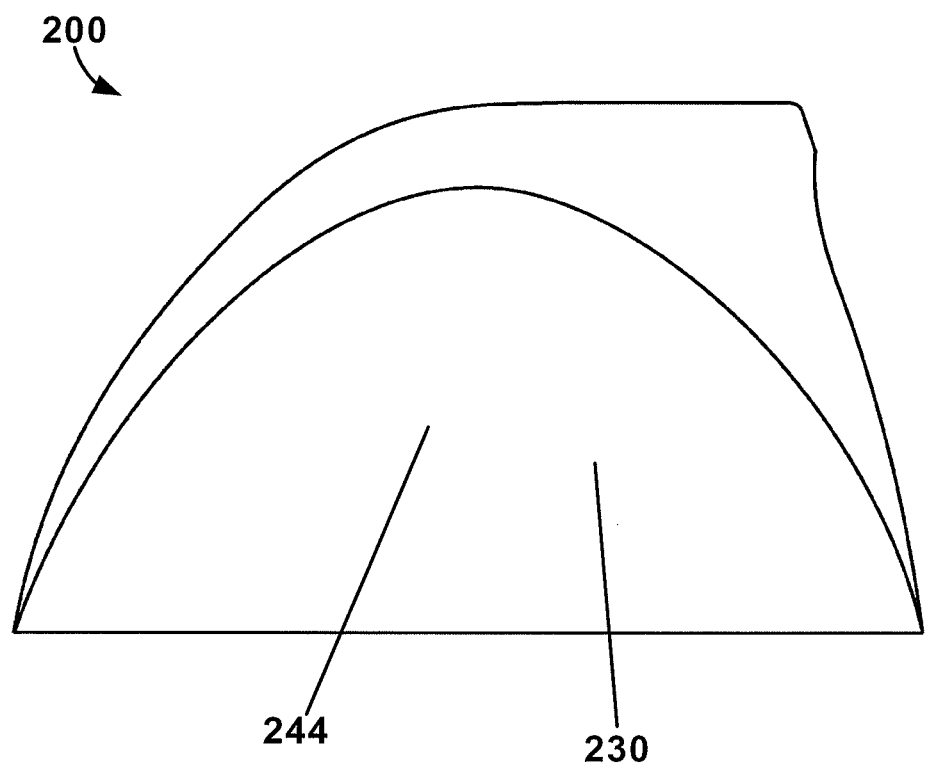
FIG. 14 is a side view of the cover of FIG. 12.
Figure 15:
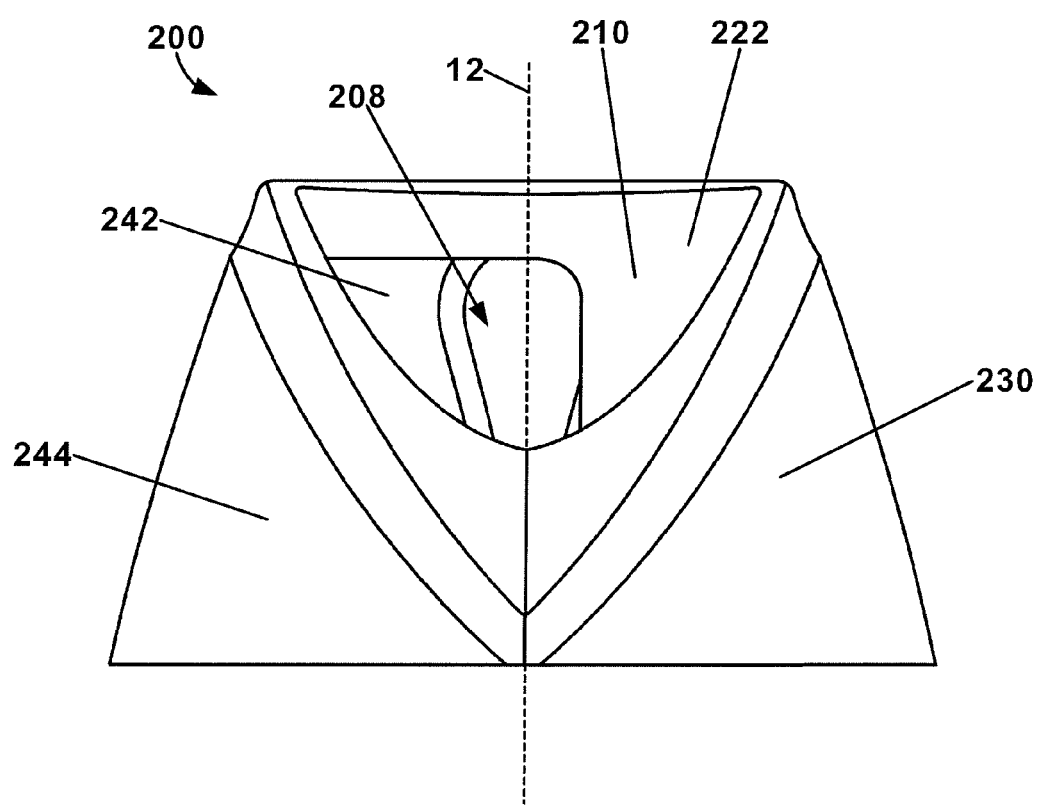
FIG. 15 is a rear view of the cover of FIG. 12.
Figure 16:
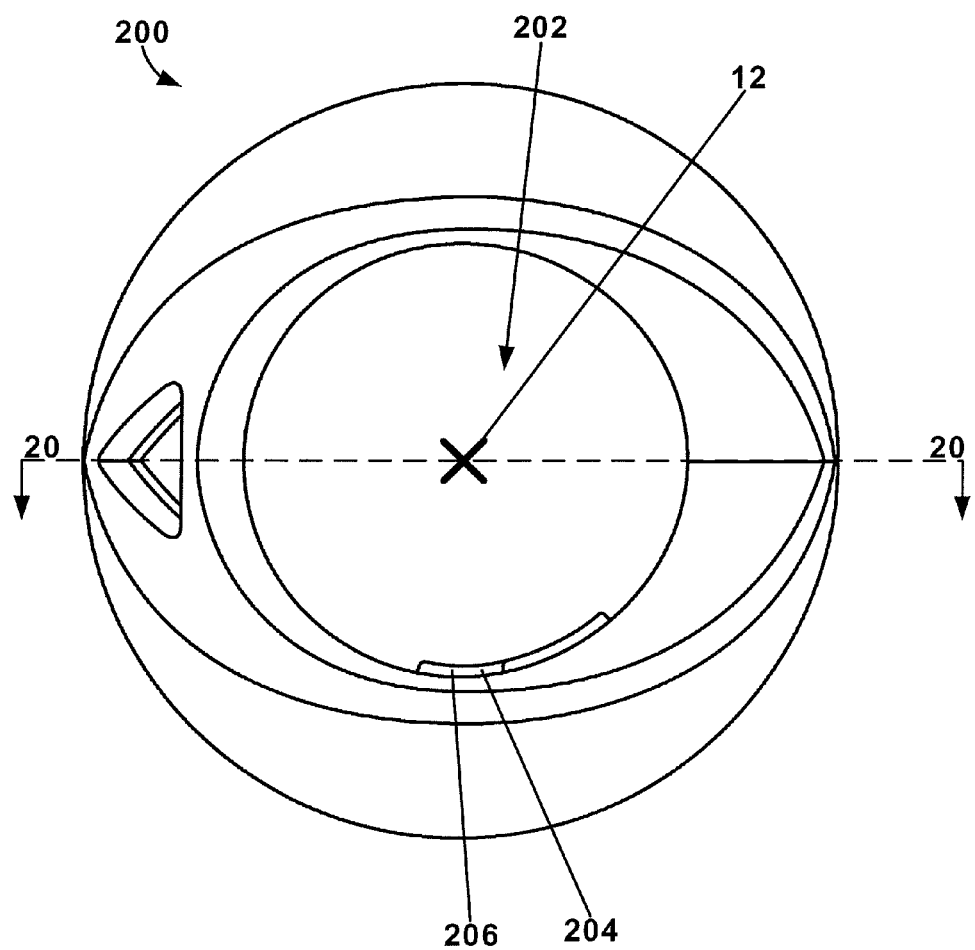
FIG. 16 is a top view of the cover of FIG. 12.
Figure 17:
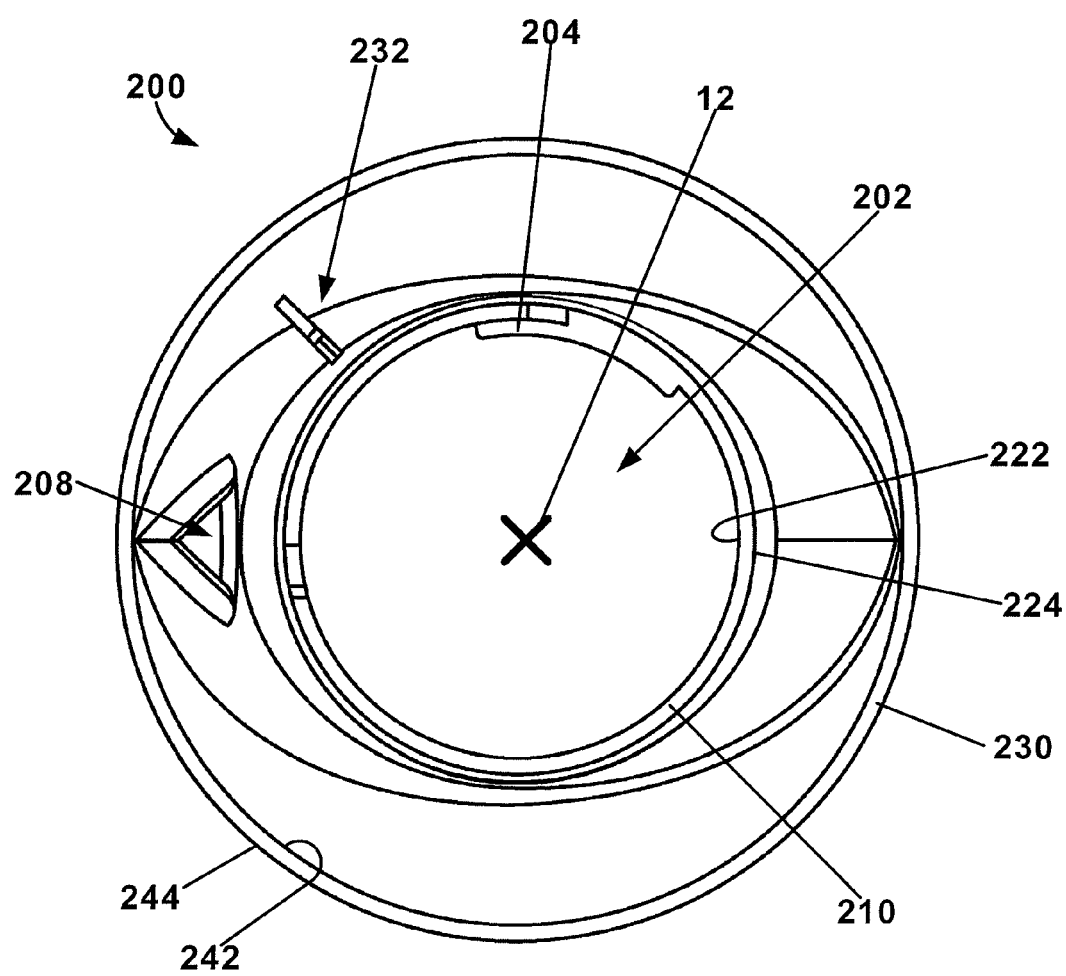
FIG. 17 is a bottom view of the cover of FIG. 12.

As shown in FIGS. 10-11, the lower portion 120 may include a bridge portion 126 connecting the lower portion 120 and the push button 140. The bridge portion 126 may be sized and formed of such resilient material that the push button 140 may be depressed to a depressed position (e.g., movement relative to the lower portion 120) and returned to a normal position without detaching from the lower portion 120.

Further, the push button 140 may be biased into the normal position such that only depression by a user may actuate the valve assembly 400 to release at least some of the pressurized contents of the spray container 5. The bridge portion 126 may provide such bias. In other embodiments, however, the push button 140 may include other componentry (e.g., springs), materials (e.g., memory foam), and/or structures that may bias the push button into the normal position.

The lower portion 120 may further include a first female locking structure 128, a second female locking structure 130, a spray opening shield portion 132, and deflectable cover retention ribs 134 that will be described herein in relation to their functions relative to the push button 140 and cover 200.

The push button 140 may include a body potion 142, an aperture portion 160, and a receiver stem portion 170 (see FIG. 11). Although depicted as being cylindrical, the push button 140 may be any shape and/or size operable to be depressed by a user to actuate a valve assembly, e.g., valve assembly 400. The push button 140 may be movable relative to the lower portion 120 of the base 100 between at least a normal position and a depressed position. When the push button 140 is in the depressed position (which is only permitted when the actuator assembly is in the unlocked position), the push button 140 may actuate the actuation valve 402 of the valve assembly 400 thereby releasing at least some of the pressurized contents of the spray container 5 through, e.g., an exit aperture 162 of the aperture portion 160 of the push button 140 of the base 100. When the push button 140 is in the normal position, the valve assembly 402 is not actuated and thereby no pressurized contents are released.

The body portion 142 of the push button 140 may extend along an axis 12 of the actuator apparatus 10 from a first end region 144 that is connectable to the lower portion 120 of the base 100, e.g., via the bridge portion 126 of the lower portion 120 of the base 100, to a second end region 146 that may be contacted (e.g., depressed by a finger) by a user. The second end region 146, as depicted, may define a sloped, concave surface 148, upon which further may be defined spray direction indicia 150 to, e.g., indicate the direction that the pressurized contents of the spray container may be released and/or whether the actuator apparatus 10 is in a locked or unlocked position. The sidewalls of the body 142 may cylindrical, e.g., as depicted, and further may be parallel to the axis 12 of the actuator apparatus 10.

The aperture portion 160 may extend radially (e.g., outwardly from the axis 12 of the actuator apparatus) from a region of the body portion 142 (e.g., the side wall thereof) and may define the exit aperture 162. When the pressurized contents are released from the spray container 5, the contents may be released (e.g., sprayed) through the exit aperture 162. In the embodiment depicted, the aperture portion 160 includes an insert aperture 166 within which the insert 300 is located. The insert 300 may be a separately manufactured component from the base 100 or may be integral with the base 100. For example, the insert 300 may be a molded feature of the aperture portion 160. As described herein, the insert 300 may be a part of the aperture portion 160 of the push button 140 of the base 100.

Figure 18:
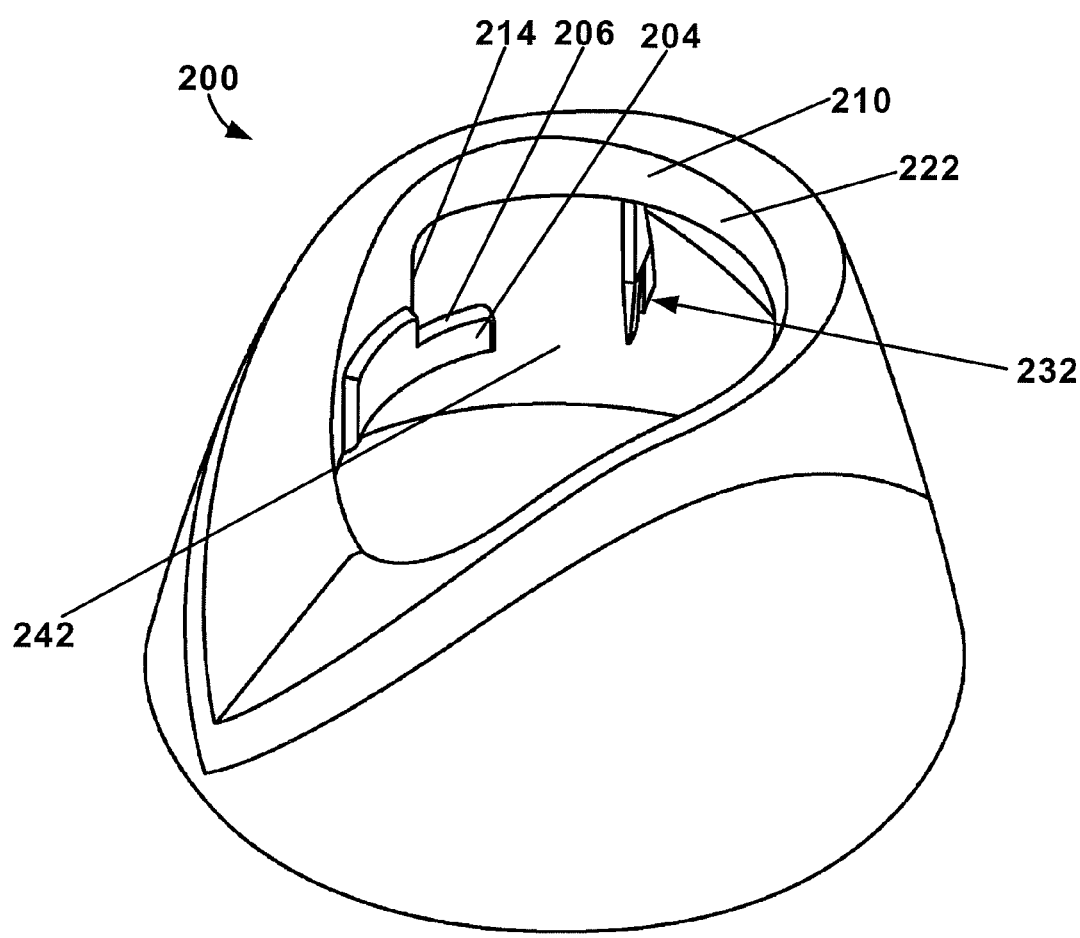
FIG. 18 is a rear perspective view of the cover of FIG. 12.
Figure 19:
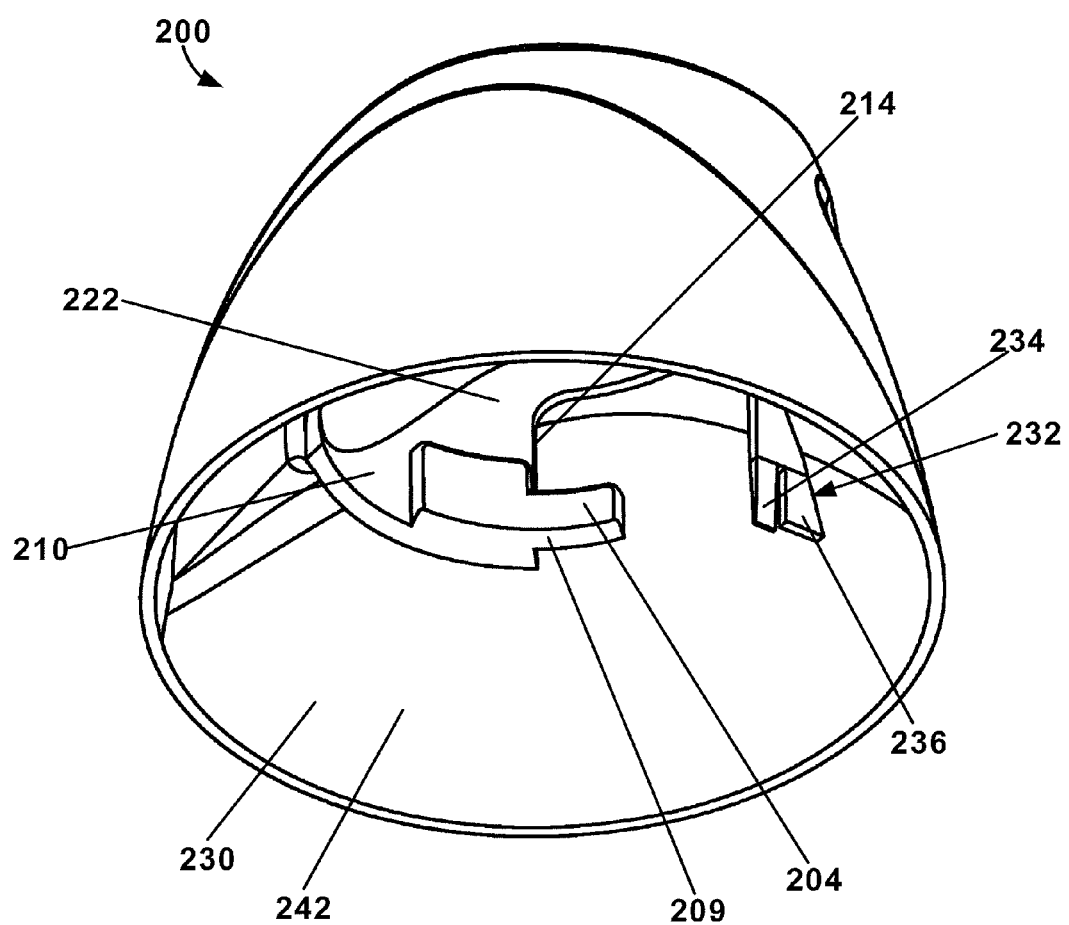
FIG. 19 is a bottom perspective view of the cover of FIG. 12.
Figure 20:
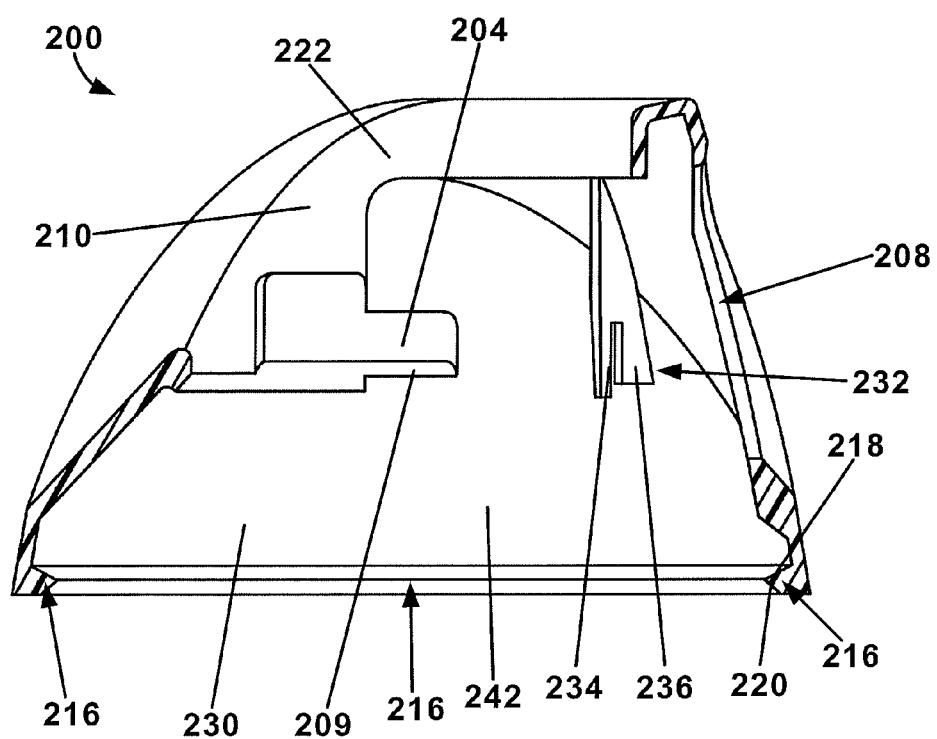
FIG. 20 is a cross-sectional view of the cover of FIG. 16 taken along line 20-20.

Further, at least in one embodiment, the aperture portion 160 extends along a portion of the height of the push button body portion 142. Also, the aperture portion 160 may have a lower surface 164 that be contacted by, e.g., a restraint structure (e.g., restraint structure 204 of FIGS. 18-19) to restrict the downward movement of the push button 140 as described herein. Although aperture portion 160 is depicted as having a lower surface 164 that is flat, the aperture portion 160 may be any size and/or shape capable of being contacted by a corresponding restraint structure (e.g., by restraint structure 204 of FIGS. 18-19) to restrict the movement of the push button 140.

Further, although in this embodiment, the aperture portion 160 is the portion of the push button 140 that may be contacted by a restraint structure (e.g., by restraint structure 204) to restrict the movement of the push button 140, the aperture portion may be separate from the portion the may be contacted to restrict movement of the push button. For example, in at least one embodiment, the aperture portion may not extend from the push button body portion and instead may be flush with the exterior of the push button body. In this embodiment, an additional structure may extend radially from the push button body portion to be contacted by a restraint structure to restrict the movement of the push button.

The receiver stem portion 170 (see FIG. 11) may receive the valve assembly 400 and may define an entrance aperture 172. A passageway 174 may be capable of transmitting gas and/or fluid and may extend from the entrance aperture 172 to the exit aperture 162 of the aperture portion 160. When the actuation valve 402 is actuated, the pressurized contents of the spray container 5 may released and may flow through the valve assembly 400 into the entrance aperture 172, through the passageway 174, and exit through the exit aperture 162.

The base 100 may further include locked and unlocked indicia 102 located on various surfaces of its components to indicate to a user what state the actuator apparatus 10 is in (e.g., unlocked or locked positions). Although the indicia 102 are depictions of a "locked padlock" and an "unlocked padlock," any indicia including graphics and/or text that may be capable of indicating to a user the state of the actuator apparatus may be included on the actuator apparatus. For example, the spray opening shield portion 132 may extend upwardly from the base 100 and may include such indicia 102. In this embodiment, the spray opening shield portion 132 has indicia 102 indicating that the actuator apparatus 10 is in a locked state, which is only viewable to user when the actuator apparatus 10 is actually in a locked state or position as described herein.

In one or more alternate embodiments, the spray opening shield portion 132 may not be used. Rather, the locked indicia may be provided on the push button body portion 142 such that it shows through the opening 208 when the apparatus is in a locked position.

The cover 200, or shroud, may be coupled to the base 100 and aligned along an axis 12 of the actuator apparatus 10. The cover 200 may define a push button opening 202 (e.g., along axis 12) that permits access to the second end region 146 of the push button 140 to allow depression (e.g., by a finger) of the push button 140 by a user when the base 100 and the cover 200 are assembled together (see, e.g., FIGS. 1-2, 25, & 27-29).

The cover 200 (as shown in FIGS. 12-20) may be coupled (e.g., rotatably coupled) to the base 100 to allow movement there between. At least in one embodiment, the cover 200 is rotatable relative to the base 100 between a locked position such that the push button 140 is restricted from moving into the depressed position and an unlocked position such that the push button 140 may be allowed to move into the depressed position. The cover 200 may include a restraint structure 204 that restricts the push button 140 from moving into the depressed position when the base 100 and/or cover 200 is in the locked position. Further, the restraint structure 204 may define an upper surface 206 and a lower surface 209 (see FIG. 19). When the base 100 and/or cover 200 is in the locked position, the restraint structure 204 may be located below the aperture portion 160 of the push button 140 of the base 100 to physically restrict the aperture portion 160 from moving downwardly, which in turn restricts the other portions of the push button 140 from moving into the depressed position. In other words, the upper surface 206 of the restraint structure 204 may directly contact the lower surface 164 of the aperture portion 160 of the push button 140 of the base 100 to restrict the movement of the push button 140 into the depressed position.

In at least one embodiment, the cover 200 may include one or more restraint structures. However, as depicted, the cover 200 includes only one restraint structure 204.

The cover 200 may further define a spray opening 208 that may be alignable with the exit aperture 162 of the aperture portion 160 of the push button 140 of the base 100 when the cover 200 is in the unlocked position. The cover 200 may further include an inner wall portion 210 lying along the axis 12 of the actuator apparatus 10 and an outer wall portion 230 located further away from the axis 12 than the inner wall portion 210. The inner wall portion 210 may further include inside surface 222 and an exterior surface 224. The inner wall portion 210, as depicted, may by cylindrical to, e.g., define at least a portion of the push button opening 202. In other embodiments, however, the inner wall portion 210 may be any shape or size to accommodate and permit depressible movement of at least a portion of the push button 140. Further, the restraint structure 204 may be located closer to the axis 12 of the actuator apparatus 10 than the inner wall portion 210 (see FIG. 16).

The inner wall portion 210 of the cover 200 may further define a first stop surface 212 and a second stop surface 214. The first stop surface 212 may be operable with the aperture portion 160 of the base 100 to stop the cover 200 and base 100 from moving (e.g., rotating about axis 12) past the unlocked position. For example, a first side surface 165A of the aperture portion 160 may contact the first stop surface 212 to stop the cover 200 from rotating relative to the base 100. When the first side surface 165A of the aperture portion 160 contacts the first stop surface 212, the aperture apparatus 10 is in the unlocked position.

The second stop surface 214 may be operable with the aperture portion 160 of the base 100 to stop the cover 200 and base 100 from moving past the locked position. For example, a second side surface 165B of the aperture portion 160 may contact the second stop surface 214 to stop the cover 200 from rotating relative to the base 100. When the second side surface 165B of the aperture portion 160 contacts the second stop surface 214, the aperture apparatus 10 is in the locked position.

The outer wall portion 230 may further define interior surface 242 and exterior surface 244. Further, the outer wall portion 230 may include a male locking structure 232 located on a portion of the interior surface 242 of the outer wall portion 230. The male locking structure 232 may engage either of the first female locking structure 128 (when in the locked position) or the second female locking structure 130 (when in the unlocked position) of the base 100 when the base 100 and the cover 200 are assembled to form the actuator apparatus 10.

Each of the female locking structures 128, 130 may include a first rib 129A, 129B and second rib 131A, 131B, respectively. Each rib 129A, 129B, 131A, 131B may extend outwardly from the lower portion 120 of the base 100 for engagement with the male locking structure 232 of the outer wall portion 230 of the cover 200.

The male locking structure 232 of the outer wall portion 230 of the cover 200 may include a deflectable portion 234 for deflectably engaging the first rib 129A of the first female locking structure 128 of the lower portion 120 of the base 100 when the cover 200 is moving into the locked position (e.g., such as to make a "click" when moving into the locked position) and for deflectably engaging the first rib 129B of the second female locking structure 130 of the lower portion 120 of the base 100 when the cover 200 is moving into the unlocked position (e.g., such as to make a "click" when moving into the unlocked position). The deflectable portion 234 may deflect to provide resistance to moving the cover 200 relative to the base 100 so as to signal or indicate to a user that the cover 200 may almost be moved (relative to the base 100) into either a locked or unlocked position. The cover 200 may be moved relative to the base 100 until the deflectable portion 234 deflects over or past one of the first ribs 129A, 129B of the first and the second female locking structures 128, 130, which provides some restriction in moving the cover 200 relative to the base 100 in the opposite direction such that a user may not inadvertently lock or unlock the actuator apparatus 100.

The male locking structure 232 of the outer wall portion 230 of the cover may further include a rigid portion 236 for engaging the second rib 131A of the first female locking structure 128 of the base 100 when the cover 200 is moved into the locked position to stop the cover 200 from moving (e.g., relative to the base 100) past the locked position and for engaging the second rib 131B of the second female locking structure 130 of the base 100 when the cover 200 is moved into the unlocked position to stop the cover from moving (e.g., relative to the base 100) past the unlocked position. The rigid portion 236 may engage the second ribs 131A, 131B so as to stop the cover 200 from moving relative to the base 100 any farther. As a result, the male locking structure 232 may be sandwiched between either the first rib 129A and the second rib 131A of the first female locking structure 128 or the first rib 129B and the second rib 131B of the second female locking structure 130 to be partially restrained/inhibited such that a user may not inadvertently lock/unlock the actuator apparatus 100 or move (e.g., rotate) the cover 200 relative to the base 100 further past either the unlocked or locked positions.

The cover 200 may further include an annular flange 216 located on the interior surface of the outer wall portion 230 of the cover 200 extending inwardly towards the axis 12 of the actuator apparatus 10 for use in coupling the cover 200 to the base 100 utilizing, e.g., the deflectable cover retention ribs 134 of the lower portion 120 of the base 100. The annular flange 216 may include an upper surface 218 (e.g., facing upwardly) and a lower surface 220 (e.g., facing downwardly), and each deflectable cover retention rib 134 may include an outer surface 136 (e.g., facing away from axis 12) and a bottom surface 138 (e.g., a surface orthogonal to axis 12).

Figure 30A:
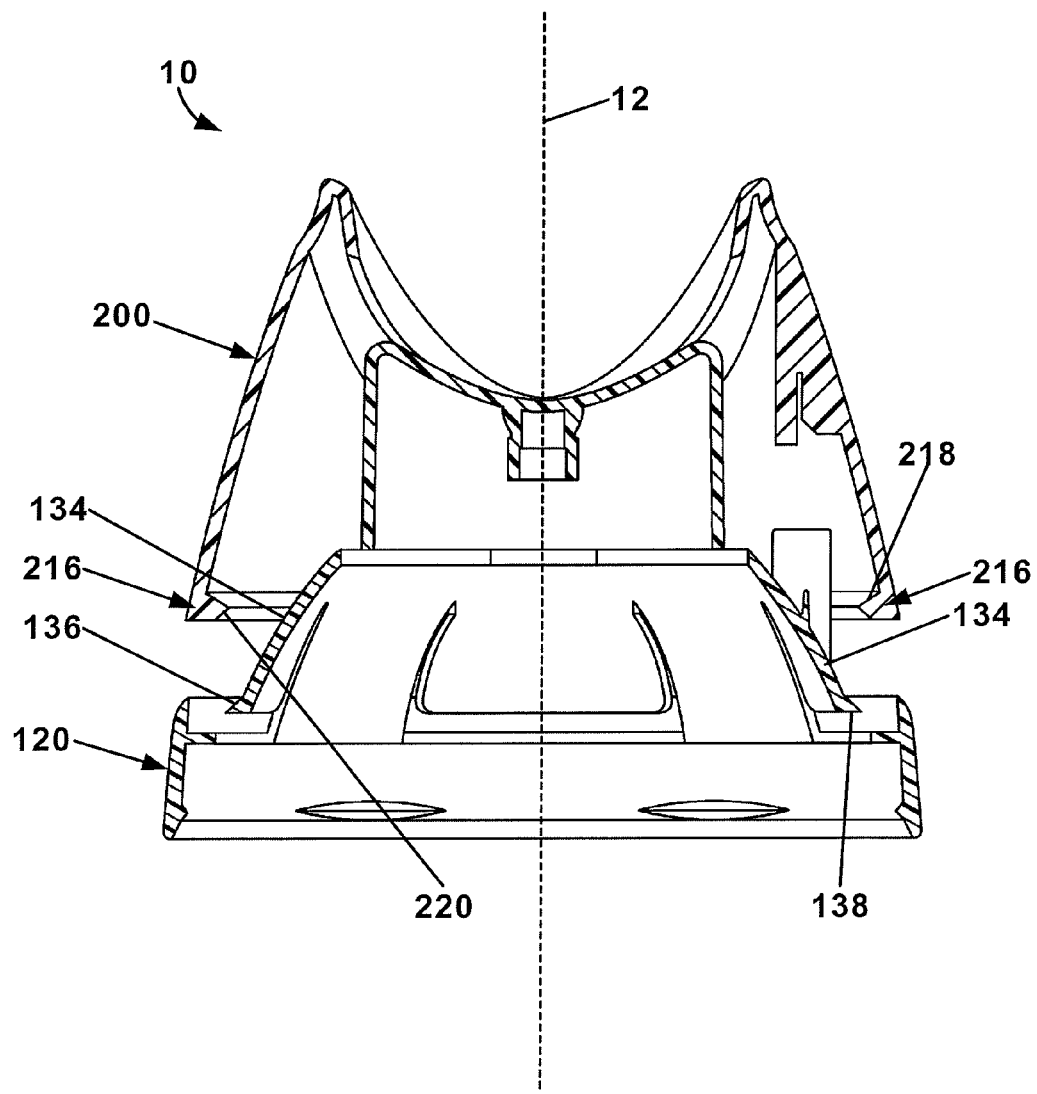
FIGS. 30A-30C are cross-sectional views illustrating assembly of the actuator apparatus of FIG. 1.
Figure 30B:
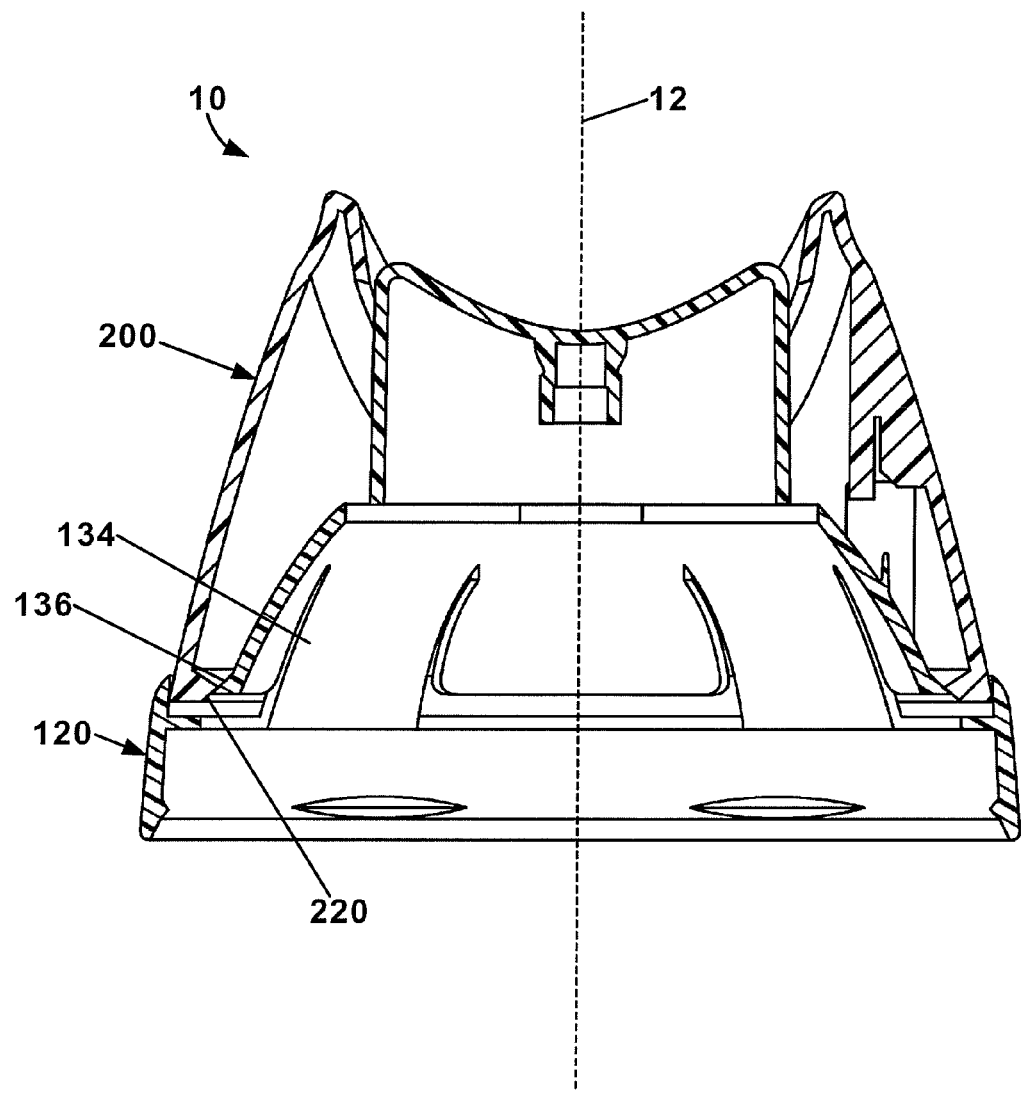
Figure 30C:
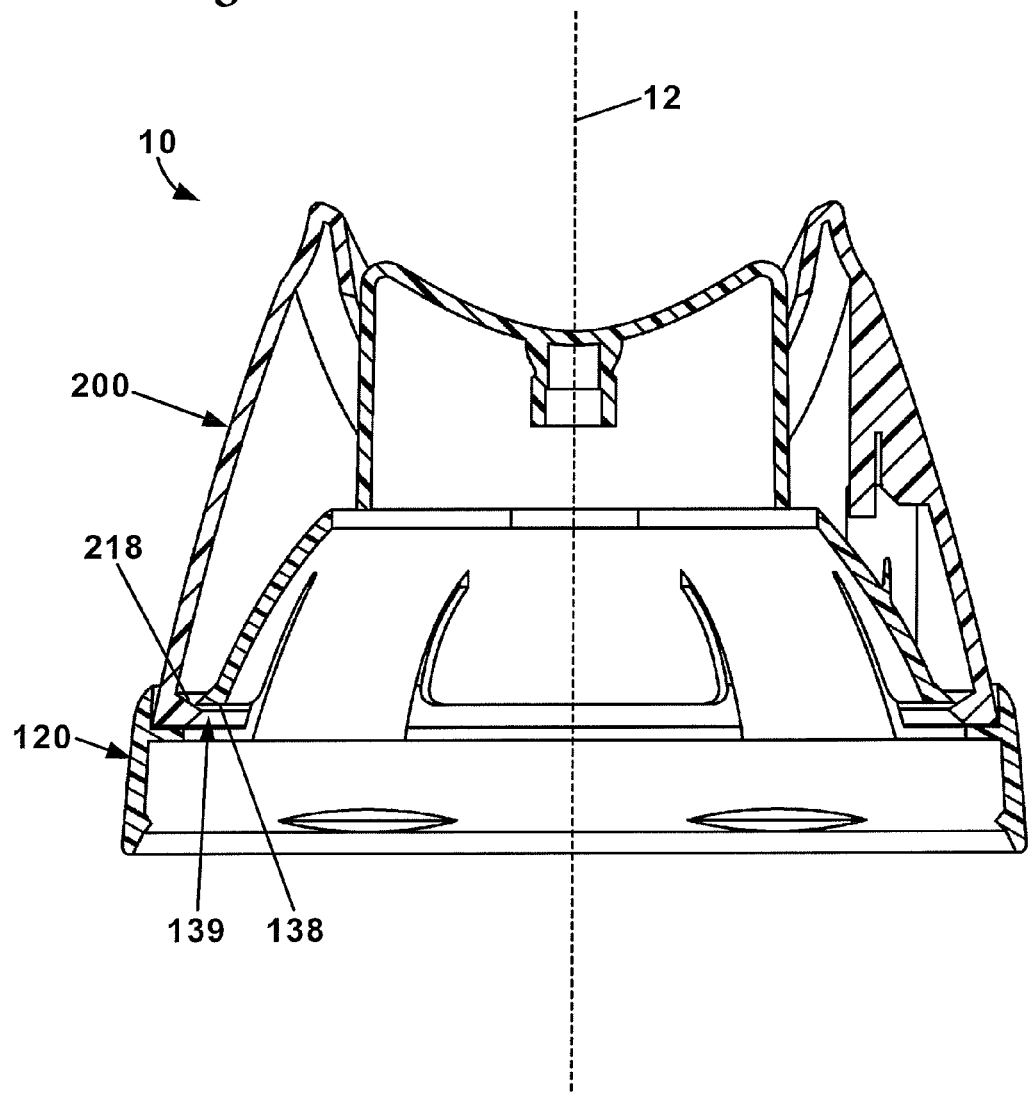

The base 100 and the cover 200 may be coupled together by aligning the base 100 and the cover 200 along an axis 12 with the cover 200 positioned above the base 100 (see FIG. 5). The base 100 and cover 200 may be moved towards each such that the push button 140 of the base 100 extends at least partially into the push button aperture 124 (see FIG. 30A). Further, the base 100 and the cover 200 are movable relative to each other between at least a pre-coupled position (see FIG. 30B), where the cover 200 not yet coupled to the base 100 but in contact thereof, and a coupled position (see FIG. 30C), where the cover 200 is coupled to the base 100. When in the pre-coupled position (see FIG. 30B), the lower surface 220 of the annular flange 216 of the cover 200 may contact the outer surface 136 of the deflectable cover retention rib 134 to deflect the deflectable cover retention rib 134 away from its normal position. When in the coupled position (see FIG. 30C), the cover 200 is "snapped" past the pre-coupled position. In the coupled position, the upper surface 218 of the annular flange 216 of the cover 200 may engage the bottom surface 138 of the deflectable cover retention rib 134 to retain the cover 200 to the base 100. An annular gap 139 may further be defined between the bottom surface 138 of the cover retention rib 134 and the lower portion 120 of the base 100. The annular gap 139 may receive the annular flange 217 of the cover 200 to allow the cover and the base to move relative each other about the axis 12 of the actuator apparatus 100.

The cover 200 and base 100 may be in the form of one or more alternate configurations to accomplish the coupling therebetween. For example, the annular flange of the cover may project outward and away from axis 12 as opposed to inward and an annular retention rib of the base may extend inward towards axis 12 (e.g., at the top of the lower portion 120 of base 100) to engage the annular flange of the cover thereunder when snapped into place. One will recognize that such snap coupling may be implemented by a variety of base and cover mating configurations.

Further, although the upper surface 218 and the lower surface 220 of the annular flange 216 converge at a point creating an edge as depicted, the upper surface 218 and the lower surface 220 may converge in a rounded or less-steep angle such that the annular flange 216 has a rounded surface facing the axis 12 of the actuator apparatus 10.

As described herein, the base 100 and the cover 200 may be movable (e.g., rotatably movable) relative to each between the locked and unlocked positions. In at least one embodiment, the base 100 is fixed relative to the spray container 5, and the cover 200 is rotatable relative to the base 100 between the locked and unlocked positions. In at least another embodiment, the cover 200 is fixed relative to the spray container 5, and the base 100 is rotatable relative to the cover 200 between the locked and unlocked positions. In this embodiment, the cover 200 may include additional structure to secure the cover 200 to the spray container 5 (e.g., structure that extends around the outside of the lower portion 120 of the base 100 or structure that extends through the push button aperture 124 of the base 100).

As described herein, the base 100 and cover 200 of the actuator apparatus 10 are movable relative to each other between a locked position and an unlocked position. Different views of the actuator apparatus 10 in the locked position are shown in FIGS. 21-24. Further, different views of the actuator apparatus 10 in the unlocked position are shown in FIGS. 25-29.

Figure 21:
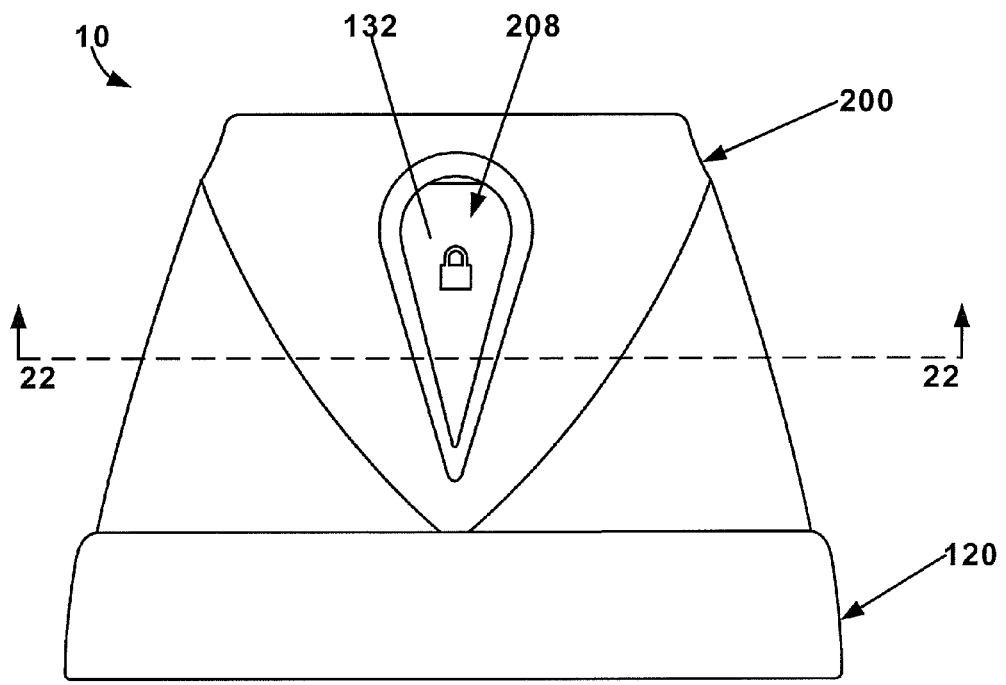
FIG. 21 is a front view of the actuator apparatus of FIG. 1 but in a locked position.

As depicted in the front view of the actuator apparatus 10 in FIG. 21, the spray opening shield portion 132 of the base 100 may be covering at least a portion (e.g., most) of the spray opening 208 of the cover 200. Locked indicia 102 may be viewable through the spray opening 208 to indicate to a user that the actuator apparatus 10 is in a locked position.

Figure 22:
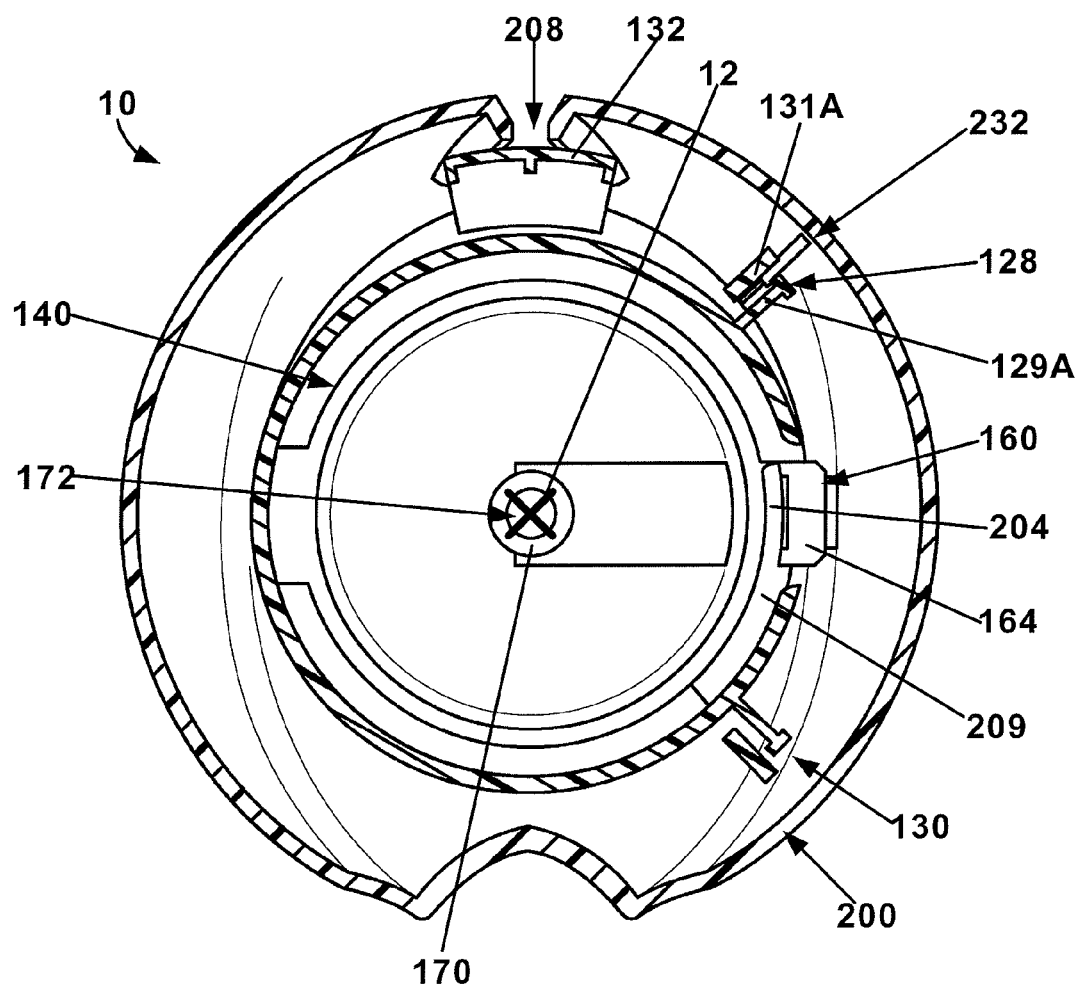
FIG. 22 is a cross-sectional view of the actuator apparatus of FIG. 21 taken along line 22-22.

As depicted in the cross-sectional view of the actuator apparatus 10 in FIG. 22, the restraint structure 204 of the cover 200 is located beneath the aperture portion 160 of the push button 140 of the base 100 to restrict the push button 140 from depression (i.e., the locked position). Further, the male locking structure 232 of the cover 200 is engaged with the first female locking structure 128 of the base 100. In this view, the male locking structure 232 can been seen sandwiched between the first rib 129A and second rib 131A of the first female locking structure 128.

Figure 23:
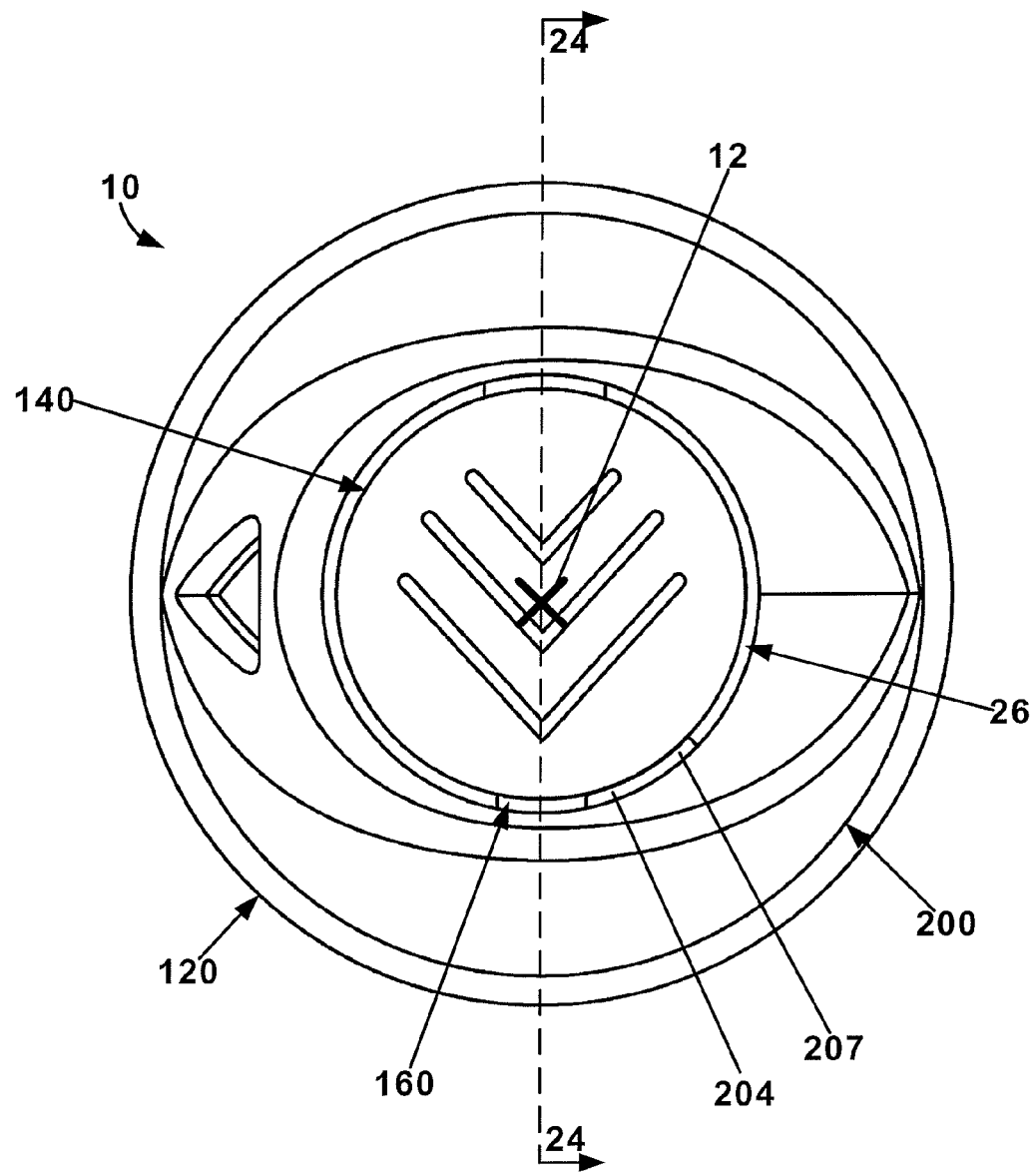
FIG. 23 is top view of the actuator apparatus of FIG. 1 but in a locked position.

When the base 100 and the cover 200 is assembled to form the actuator 10, a gap 26 may exist between the push button 140 and the inner wall portion 210 of the cover 200 as shown in FIG. 23. A portion 207 of the restraint structure 204 may be seen in the gap 26 that does not extend beneath the aperture portion 160 of the push button 140 of the base 100. This portion 207 of the restraint structure 204 may further provide support to the restraint structure 204 and may engage the second side surface of the 165B of the aperture portion 160 of the push button 140 of the base 100 when in the locked position to, e.g., stop the base 100 and/or cover 200 from moving further past the locked position. Further, this view shows that at least a portion of the restraint structure 204 may be located closer to the axis 12 of the actuator apparatus 10 than the inner wall portion 210 of the cover 200.

Figure 24:
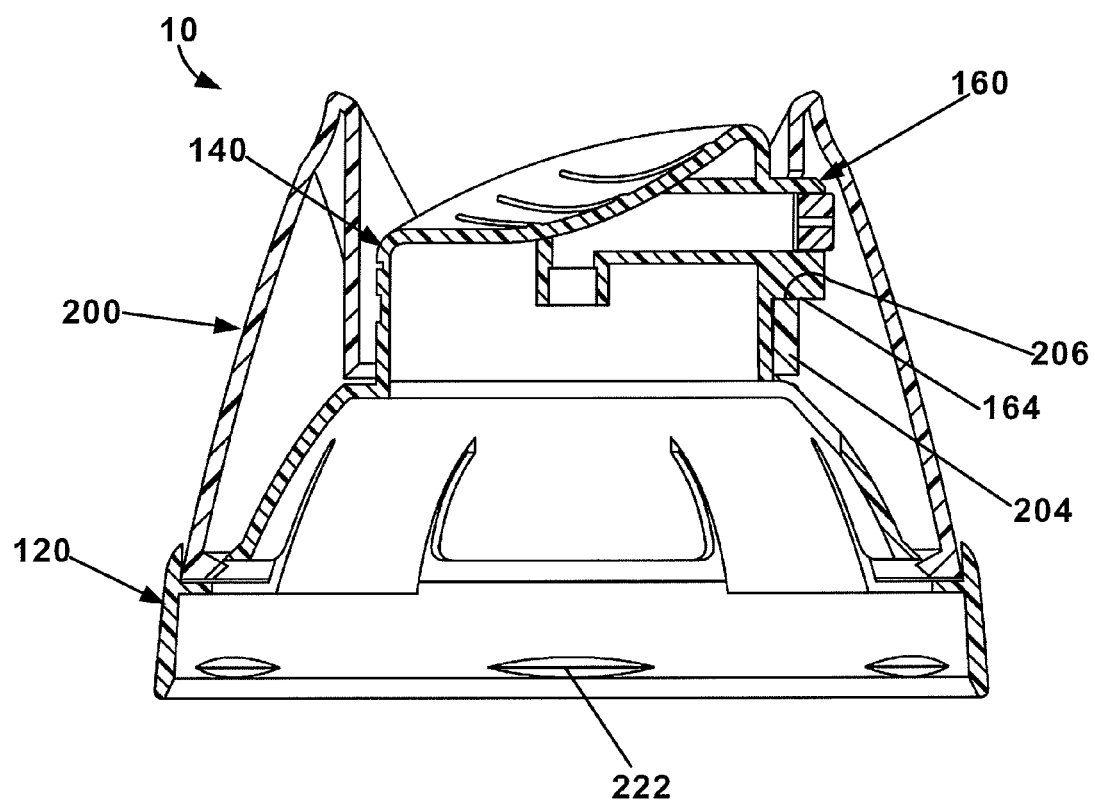
FIG. 24 is a cross-sectional view of the actuator apparatus of FIG. 23 taken along line 24-24.

Another view of the actuator apparatus 24 in the locked position may be shown in FIG. 24. In this view, the upper surface 206 of the restraint structure 204 of the cover may be shown to engage the lower surface 164 of the aperture portion 160 of the push button.

Figure 25:
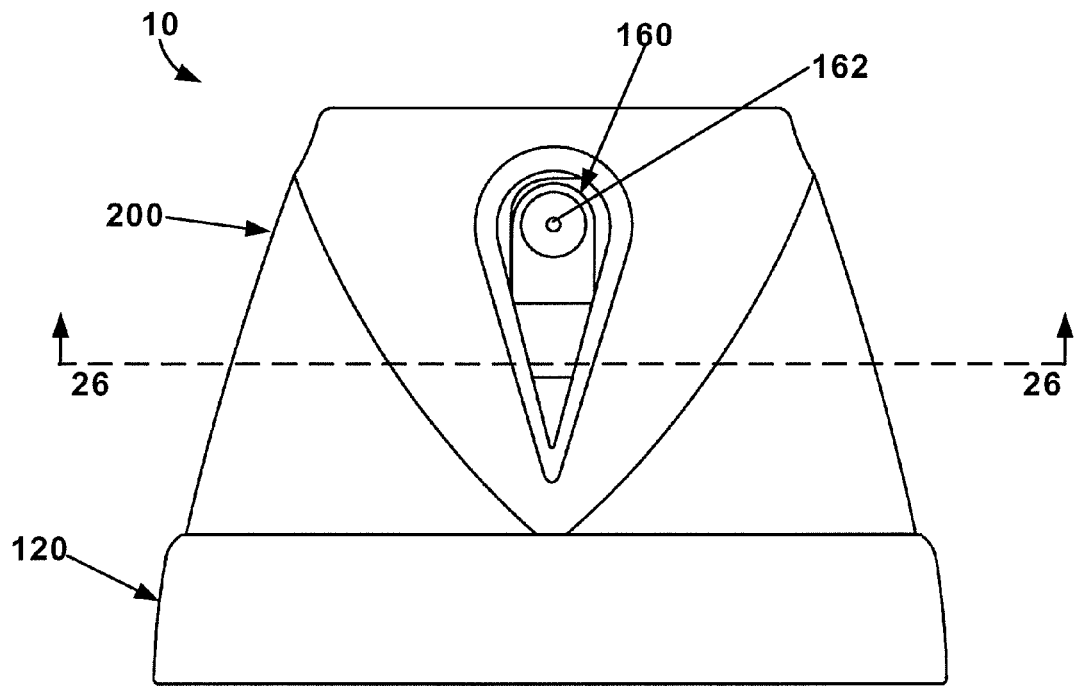
FIG. 25 is a front view of the actuator apparatus of FIG. 1 in an unlocked position.
Figure 26:
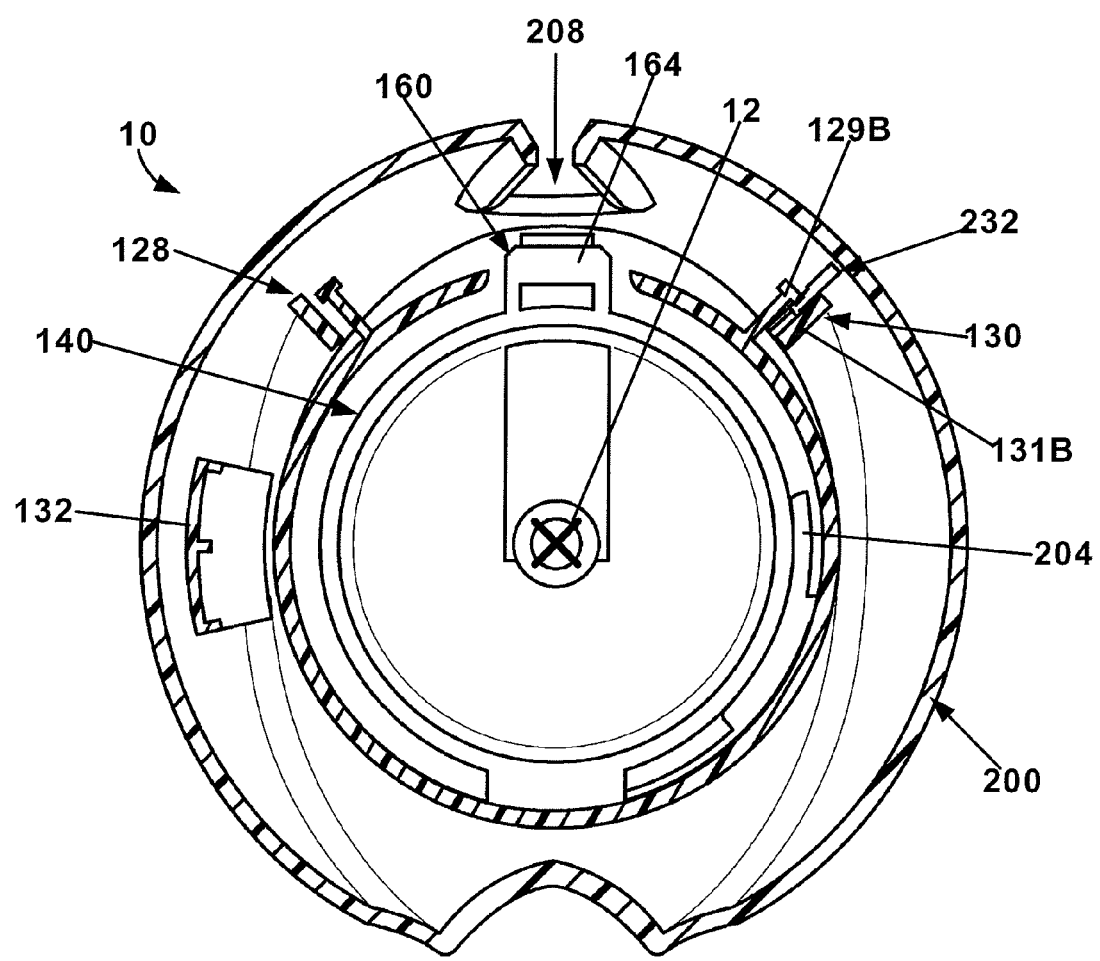
FIG. 26 is a cross-sectional view of the actuator apparatus of FIG. 25 taken along line 26-26.

The actuator apparatus 10 is shown in the unlocked position in FIGS. 25-29. The front view of the actuator apparatus 10 as depicted in FIG. 25 shows that the aperture portion 160 may be viewable through the spray opening 208 of the cover 200 when the actuator apparatus 10 is in the unlocked position. The cross-sectional view of the actuator apparatus 10 as depicted in FIG. 26 further shows the aperture portion 160 aligned with the spray opening 208. Further, the male locking structure 232 of the cover 200 is shown to be engaged with the second female locking structure 130 of the base. In this view, the male locking structure 232 can be seen sandwiched between the first rib 129B and second rib 131B of the second female locking structure 130.

Figure 27:
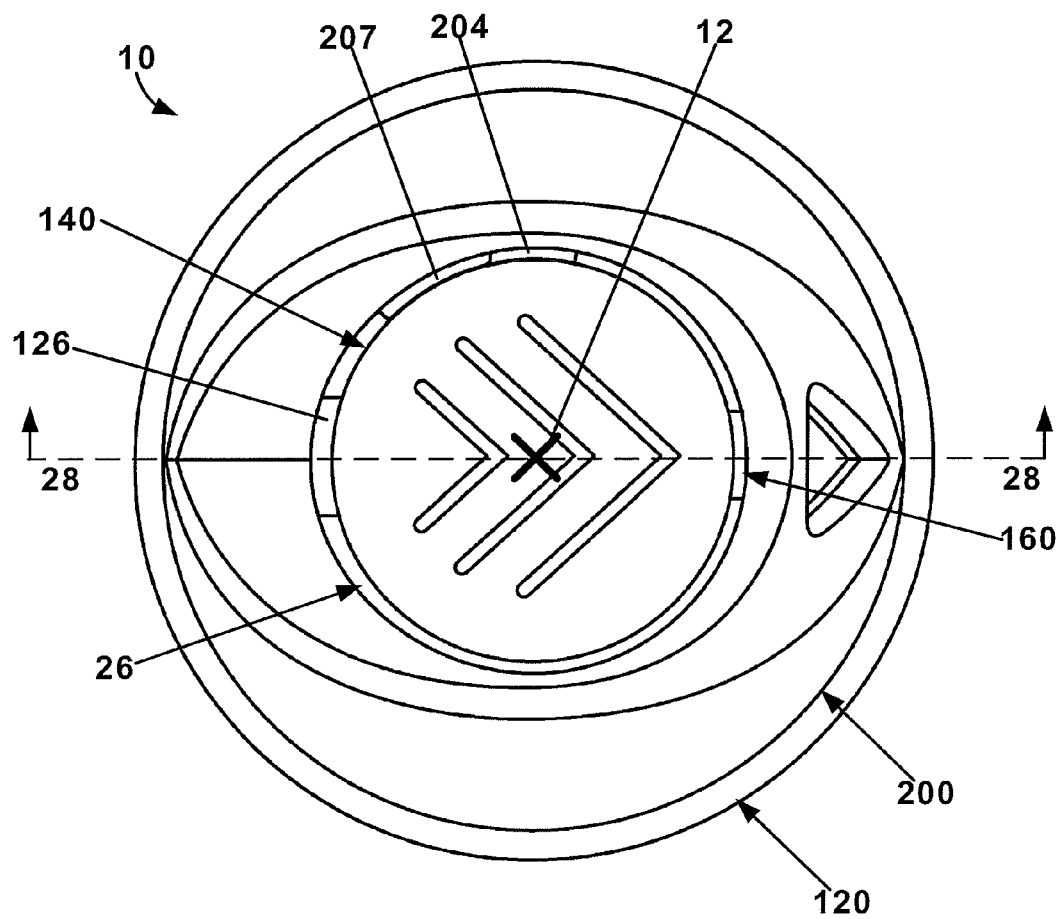
FIG. 27 is a top view of the actuator apparatus of FIG. 1 in an unlocked position.

As depicted in FIG. 27, the restraint structure 204 including portion 207 may be seen in the gap 26 about a 90 degrees around the axis 12 from the spray opening 208 of the cover 200 such as to not impede or inhibit the depressible movement of the push button 140 and/or aperture portion 160. Further, the exit aperture 162 of the aperture 160 is aligned with the spray opening 208 (see FIG. 28) such that contents that may be released through the exit aperture 162 may further exit through the spray opening 208.

Figure 29:
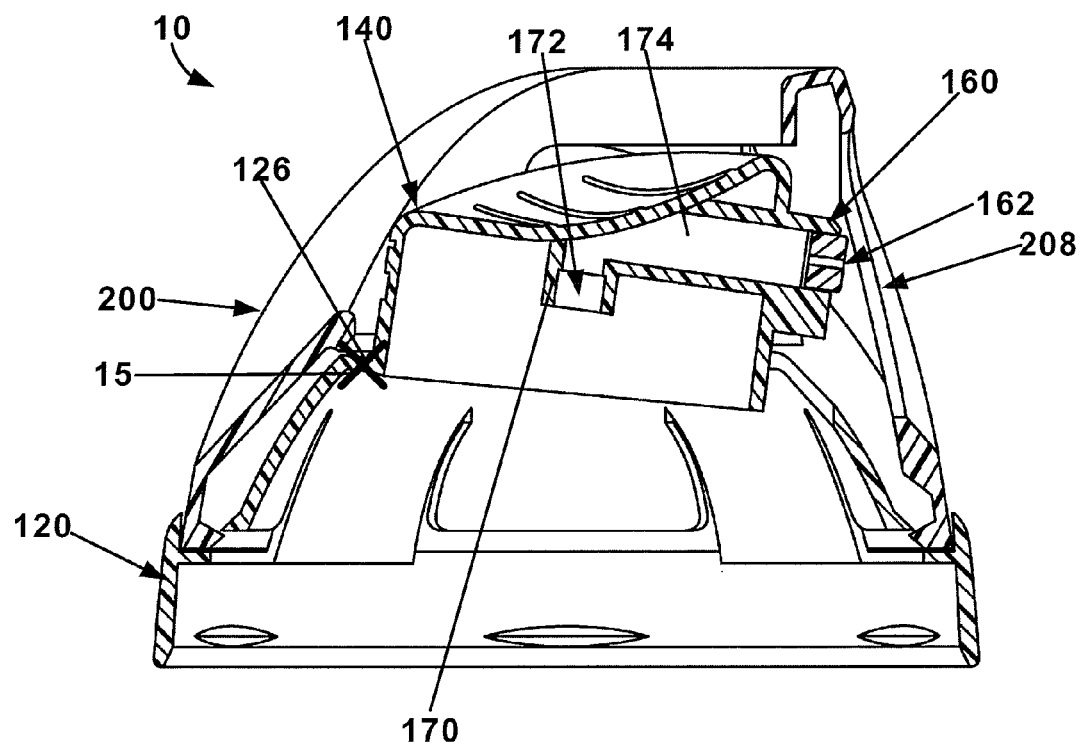
FIG. 29 is a cross-sectional view of the actuator apparatus of FIG. 27 taken along line 28-28 with the push button in a depressed position.

The push button 140 is shown to be in the normal position as shown in FIG. 28 and in the depressed position in FIG. 29. When the push button 140 is in the depressed position (e.g., a user may depress the push button 140 with their finger), the receiver stem portion 170 of the push button 140 of the base 100 may actuate the actuation valve 402 of the valve assembly 400 (not shown in FIGS. 28-29) to release at least some of the pressurized contents of the spray container 5. When the push button 140 is no longer being depressed, the push button 140 may move (e.g., resiliently move) back to the normal position as shown in FIG. 28.

In at least this embodiment, the push button 28 when depressed may pivot (e.g., about 1 degree to about 45 degrees) about an axis 15 extending through the bridge portion 126 of the base 100 (see FIG. 29). In other embodiments, the push button may move differently than pivotally, e.g., downwardly.

Although in this embodiment the bridge portion 126 of the base 100 is the portion of the base 100 that biases the push button 140 in the normal position, in other embodiments additional components may be included to bias the push button 140 in the normal position (e.g., springs, memory foam, etc.).

Further, the components of the actuator apparatus 10, e.g., the cover 200 or base 100, may be formed of polymers, polypropylene, or any other material or combination of materials as known by one having ordinary skill in the art.

Still further, the cover 100 and the base 200 of the actuator apparatus 10 may be manufactured through any molding process as known by one having ordinary skill in the art, e.g., injection molding, transfer molding, compression molding, etc. In at least one embodiment, the cover 100 and the base 200 may be formed using a two-piece mold. In other embodiments, the components of the actuator apparatus 10 may be formed using various two or more piece molds as well as other manufacturing techniques.

For example, a method 600 of manufacturing a cover (e.g., cover 200) for an actuator apparatus is shown in FIG. 31. In at least this embodiment, the actuator apparatus may have a base that may include a lower portion and a centrally-located push button depressibly attached to the lower portion.

The method 600 may include providing a mold (block 602). The mold may define a cavity for forming the cover. In at least this embodiment, the cover may be similar to the cover 200 shown in FIGS. 12-20. For example, the cover may define a centrally-located push button opening that permits access to the push button of the base when assembled with the base. Further, the cover may include an inner wall portion lying along an axis of the actuator apparatus when assembled with the base. The inner wall portion of the cover may define at least a portion of the push button opening and an outer wall portion may be located a distance further away from the axis than the inner wall portion when assembled with the base. Further, the outer wall portion of the cover may define a spray opening. The restraint structure may extend from the inner wall portion and at least a portion of that restraint structure may be located closer to the axis of the actuator apparatus when assembled than the inner wall portion of the cover.

Providing a mold (block 602) may include providing a first mold portion (block 604) and providing a second mold portion (block 606). The first mold portion may define a first molding surface corresponding to at least outer and inner wall portion surfaces of the cover facing a first direction and at least a lower surface of the restraint structure. In at least one embodiment using the cover 200, for example, the first molding surface may correspond to the interior surface 242 of the outer wall portion 230, the exterior surface 224 of the inner wall portion 210, and the lower surface 209 of the restraint structure 204.

The second mold portion may define a second molding surface corresponding to at least outer and inner wall portion surfaces of the cover facing a second direction opposite from the first direction and at least an upper surface of the restraint structure. In at least one embodiment using the cover 200, for example, the first molding surface may correspond to the exterior surfaces 244 of the outer wall portion 230, the interior surface 222 of the inner wall portion 210, and the upper surface 206 of the restraint structure 204.

The method 600 may further include positioning the first mold portion relative to the second mold portion (block 608) such that the first molding surface of the first mold portion and the second molding surface of the second mold portion define the cavity of the mold for forming the cover. Still further, the method may include introducing moldable material into the cavity of the mold (block 610) and forming the cover from the moldable material within the cavity of the mold (block 612). And still further, the method may include moving the first mold portion relative to the second mold portion for removing the cover from the cavity of the mold (block 614), and removing the cover from the cavity of the mold (block 616).

The complete disclosure of the patents, patent documents, and publications cited in the Background, the Detailed Description of Exemplary Embodiments, and elsewhere herein are incorporated by reference in their entirety as if each were individually incorporated.

Illustrative embodiments of this invention are discussed and reference has been made to possible variations within the scope of this invention. These and other variations, combinations, and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof.

What is claimed is:

1. A method of manufacturing a cover for an actuator apparatus having a base comprising a lower portion and a centrally-located push button depressibly attached to the lower portion, wherein the method of manufacturing comprises:
providing a mold defining a cavity for forming the cover, wherein the cover defines a centrally-located push button opening that permits access to the push button of the base when assembled with the base, wherein the cover comprises:
an inner wall portion lying along an axis of the actuator apparatus when assembled with the base, wherein the inner wall portion defines at least a portion of the push button opening;
an outer wall portion at a distance further away from the axis than the inner wall portion when assembled with the base, wherein the outer wall portion defines a spray opening; and
a restraint structure extending from the inner wall portion, wherein at least a portion of the restraint structure is located closer to the axis of the actuator apparatus when assembled than the inner wall portion of the cover,
wherein the mold comprises:
a first mold portion defining a first molding surface corresponding to at least outer and inner wall portion surfaces of the cover facing a first direction and at least a lower surface of the restraint structure; and
a second mold portion defining a second molding surface corresponding to at least outer and inner wall portion surfaces of the cover facing a second direction opposite from the first direction and at least an upper surface of the restraint structure;
positioning the first mold portion relative to the second mold portion such that the first molding surface of the first mold portion and the second molding surface of the second mold portion define the cavity of the mold for forming the cover;
introducing moldable material into the cavity of the mold;
forming the cover from the moldable material within the cavity of the mold;
moving the first mold portion relative to the second mold portion for removing the cover from the cavity of the mold;
removing the cover from the cavity of the mold;
wherein the centrally-located push button comprises:
a body portion extending along an axis of the actuator apparatus between a first end region connectable to the lower portion of the base and a second end region to be contacted for depression of the push button by a user,
an aperture portion extending radially from a region of the body portion with the aperture portion defining an exit aperture, and
a receiver stem portion for receiving a valve assembly, wherein the receiver stem portion defines an entrance aperture, wherein a fluid passageway extends between the entrance aperture and the exit aperture, wherein the centrally-located push button is movable relative to the lower portion of the base between at least a normal position and a depressed position, wherein the centrally-located push button actuates the valve assembly when in the depressed position to provide a spray through the exit aperture, and wherein the centrally-located push button opening permits access to the second end region of the body portion of the push button to allow depression of the push button by the user, wherein the cover and the base are movable relative to each other between at least a locked position such that the push button is restricted from moving into the depressed position and an unlocked position such that the push button is allowed to move into the depressed position,
wherein the cover further defines a spray opening alignable with the exit aperture of the aperture portion when assembled with the base and when the cover is in the unlocked position, and
further wherein the restraint structure is locatable below and underneath the aperture portion of the push button of the base to restrict the push button from moving into the depressed position when the cover is in the locked position.

2. The method of claim 1, wherein the cover comprises only one restraint structure.

3. The method of claim 1, wherein forming the cover with the mold comprises at least one of compression molding, injection molding, and transfer molding.

4. The method of claim 1, wherein the upper surface of the restraint structure of the cover directly contacts a lower surface of the aperture portion of the push button to restrict the push button from moving into the depressed position when the cover is in the locked position.

5. A method of manufacturing a cover for an actuator apparatus for a spray container, wherein the actuator apparatus comprises a base comprising:
a lower portion couplable to the spray container; and
a centrally-located push button depressibly attached to the lower portion, wherein the push button comprises:
a body portion extending between a first end region connectable to the lower portion of the base and a second end region to be contacted for depression of the push button by a user; and
an aperture portion extending radially from a region of the body portion, wherein the push button is movable relative to the lower portion of the base by depression of the push button by the user, wherein the aperture portion defines an exit aperture;
and wherein the method of manufacturing comprises:
providing a mold defining a cavity for forming the cover, wherein the cover defines a centrally-located push button opening that permits access to the second end region of the body portion to allow depression of the push button by the user when assembled with the base, wherein the cover and the base are rotatably movable relative to each other between an unlocked position and a locked position when the cover is assembled with the base, wherein the cover comprises:
a cylindrical inner wall portion lying parallel to an axis of the actuator apparatus when assembled with the base, wherein the cylindrical inner wall portion defines at least a portion of the centrally-located push button opening,
an outer wall portion at a distance further away from the axis than the cylindrical inner wall portion when assembled with the base, wherein the outer wall portion defines a spray opening, and
a restraint structure extending from the cylindrical inner wall portion, wherein at least a portion of the restraint structure is located closer to the axis of the actuator apparatus when assembled than the cylindrical inner wall portion of the cover, and wherein the cover defines a spray opening alignable with the exit aperture when assembled by rotating the cover and the base relative to each other when in the unlocked position, and wherein the mold comprises:
- a first mold portion defining a first molding surface corresponding to at least outer wall portion surfaces and cylindrical inner wall portion surfaces of the cover facing a first direction and at least a lower surface of the restraint structure; and
- a second mold portion defining a second molding surface corresponding to at least outer wall portion surfaces and cylindrical inner wall portion surfaces of the cover facing a second direction opposite from the first direction and at least an upper surface of the restraint structure, wherein the upper surface of the restraint structure is locatable below and underneath the aperture portion of the push button when assembled with the base to restrict the push button from moving into the depressed position when the cover is in the locked position;
- positioning the first mold portion relative to the second mold portion such that the first molding surface of the first mold portion and the second molding surface of the second mold portion define the cavity of the mold for forming the cover;
- introducing moldable material into the cavity of the mold;
- forming the cover from the moldable material within the cavity of the mold;
- moving the first mold portion relative to the second mold portion for removing the cover from the cavity of the mold; and
- removing the cover from the cavity of the mold.

6. The method of claim 5, wherein the cover comprises only one restraint structure.

7. The method of claim 5, wherein forming the cover with the mold comprises at least one of compression molding, injection molding, and transfer molding.

8. The method of claim 5, wherein the cylindrical inner wall portion of the cover further defines:
- a first stop surface operable with the aperture portion of the push button of the base to stop the cover from moving past the unlocked position; and
- a second stop structure operable with the aperture portion of the push button of the base to stop the cover from moving past the locked position.

9. The method of claim 5, wherein the lower portion of the base further comprises first and second female locking structure, wherein the outer wall portion of the cover further comprises a male locking structure located on an interior surface of the outer wall portion, wherein the male locking structure of the outer wall portion engages the first female locking structure of the lower portion of the base when the cover is in the locked position, and wherein the male locking structure of the outer wall portion of the cover engages the second female locking structure of lower portion of the base when the cover is in the unlocked position.

10. The method of claim 9, wherein each female locking structure of the first and second female locking structures of the lower portion of the base comprise a first and second rib, wherein each rib of the first and second rib extend outwardly from the lower portion of the base; and wherein the male locking structure of the outer wall portion of the cover comprises:
- a deflectable portion for deflectably engaging the first rib of the first female locking structure of the lower portion of the base when the cover is moving into the locked position and for deflectably engaging the first rib of the second female locking structure of the lower portion of the base when the cover is moving into the unlocked position; and
- a rigid portion for engaging the second rib of the first female locking structure of the base when the cover is moved into the locked position to stop the cover from moving past the locked position and for engaging the second rib of the second female locking structure of the base when the cover is moved into the unlocked position to stop the cover from moving past the unlocked position.

11. The method of claim 5, wherein the cover further comprises an annular flange located on an interior surface of the outer wall portion of the cover extending inwardly towards the axis of the actuator apparatus to engage at least one deflectable cover retention rib of the lower portion of the base when assembled to couple the cover to the lower portion of the base.

12. The method of claim 5, wherein the spray container contains a liquid material.

13. The method of claim 12, wherein the liquid material contained by the spray container comprises paint.

* * * * *